May 21, 1940.   A. H. DICKINSON   2,201,825
IMPULSE CREATING AND SELECTING DEVICE FOR ACCOUNTING MACHINES
Filed May 6, 1937   13 Sheets-Sheet 1

Inventor
Arthur H. Dickinson
Cooper, Kerr & Dunham
Attorneys

May 21, 1940. A. H. DICKINSON 2,201,825
IMPULSE CREATING AND SELECTING DEVICE FOR ACCOUNTING MACHINES
Filed May 6, 1937 13 Sheets-Sheet 2

May 21, 1940.　　A. H. DICKINSON　　2,201,825
IMPULSE CREATING AND SELECTING DEVICE FOR ACCOUNTING MACHINES
Filed May 6, 1937　　13 Sheets-Sheet 4
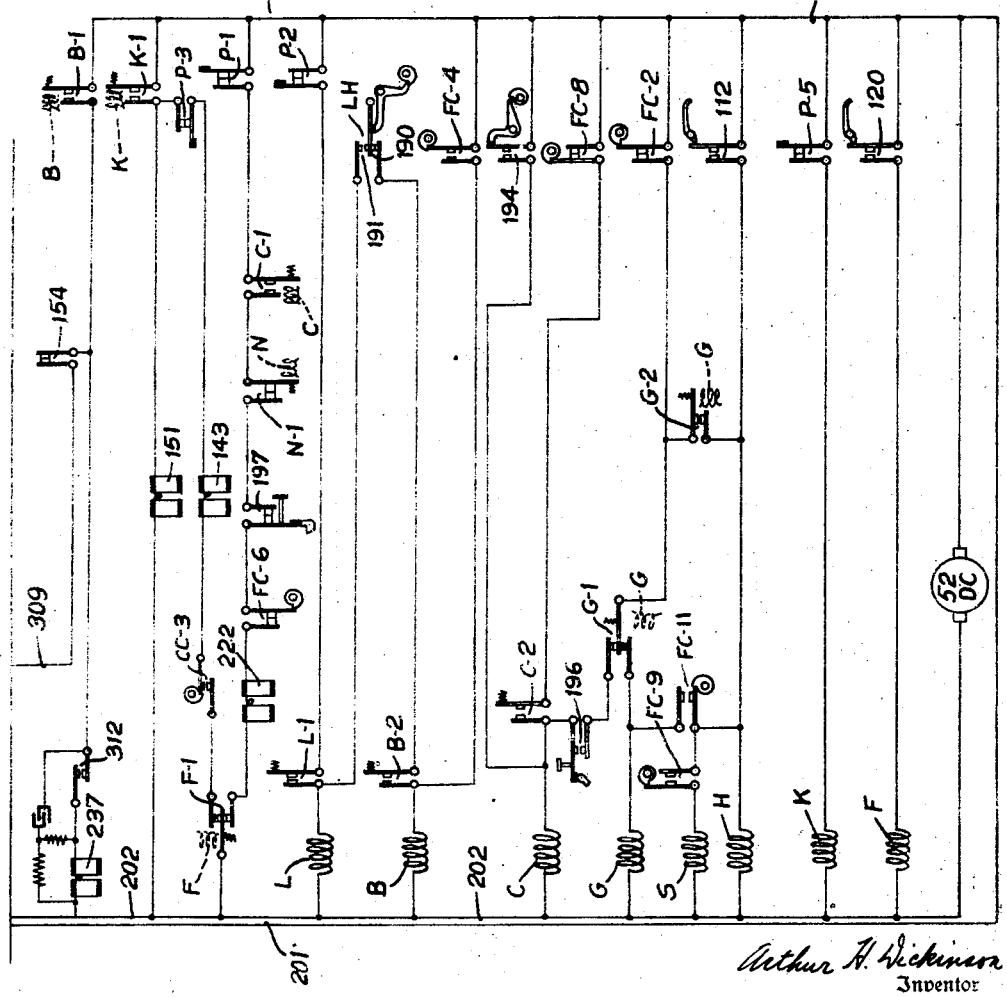

May 21, 1940.   A. H. DICKINSON   2,201,825
IMPULSE CREATING AND SELECTING DEVICE FOR ACCOUNTING MACHINES
Filed May 6, 1937   13 Sheets-Sheet 5
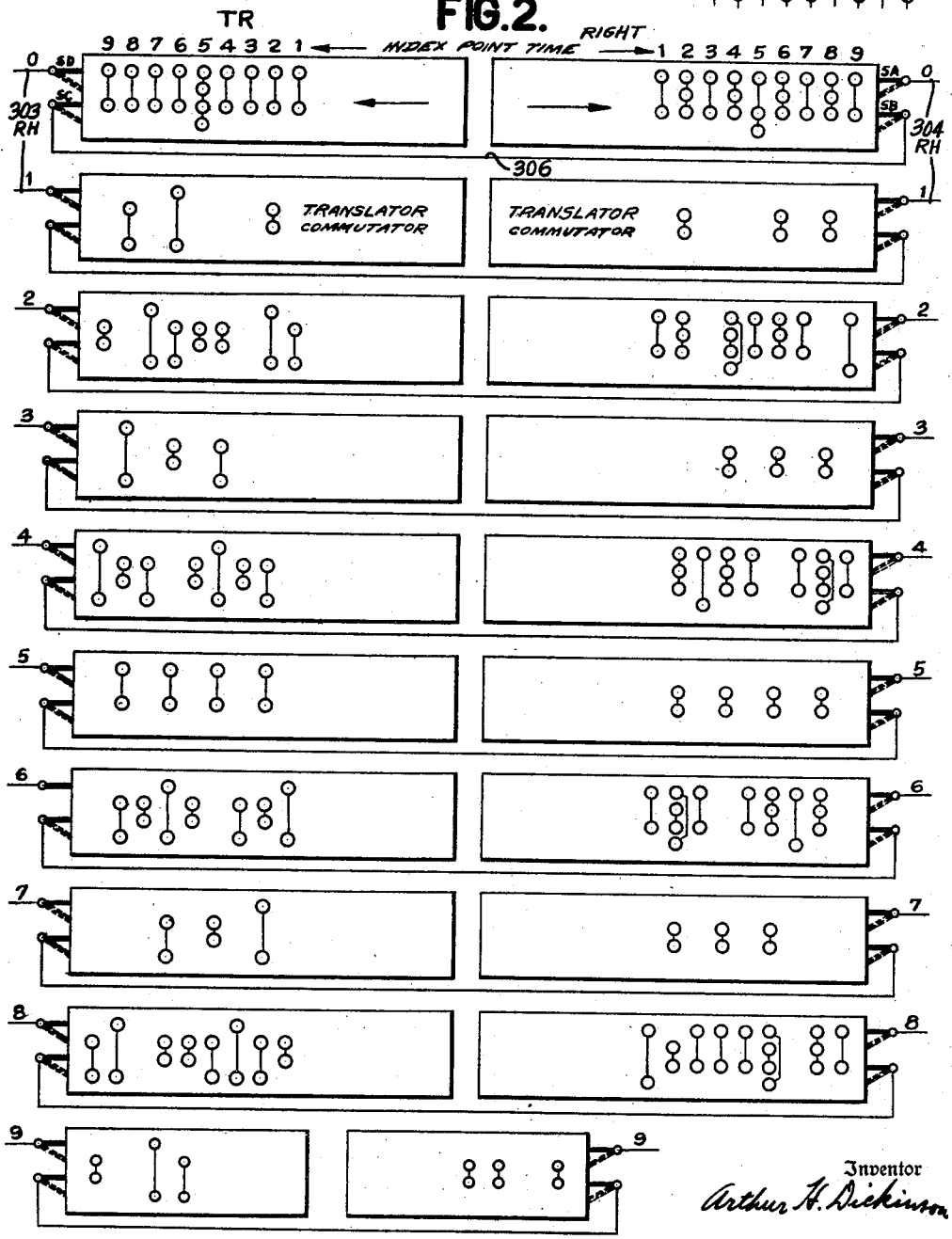

May 21, 1940.  A. H. DICKINSON  2,201,825
IMPULSE CREATING AND SELECTING DEVICE FOR ACCOUNTING MACHINES
Filed May 6, 1937  13 Sheets-Sheet 6

Inventor
Arthur H. Dickinson
Cooper, Kerr & Dunham
Attorneys

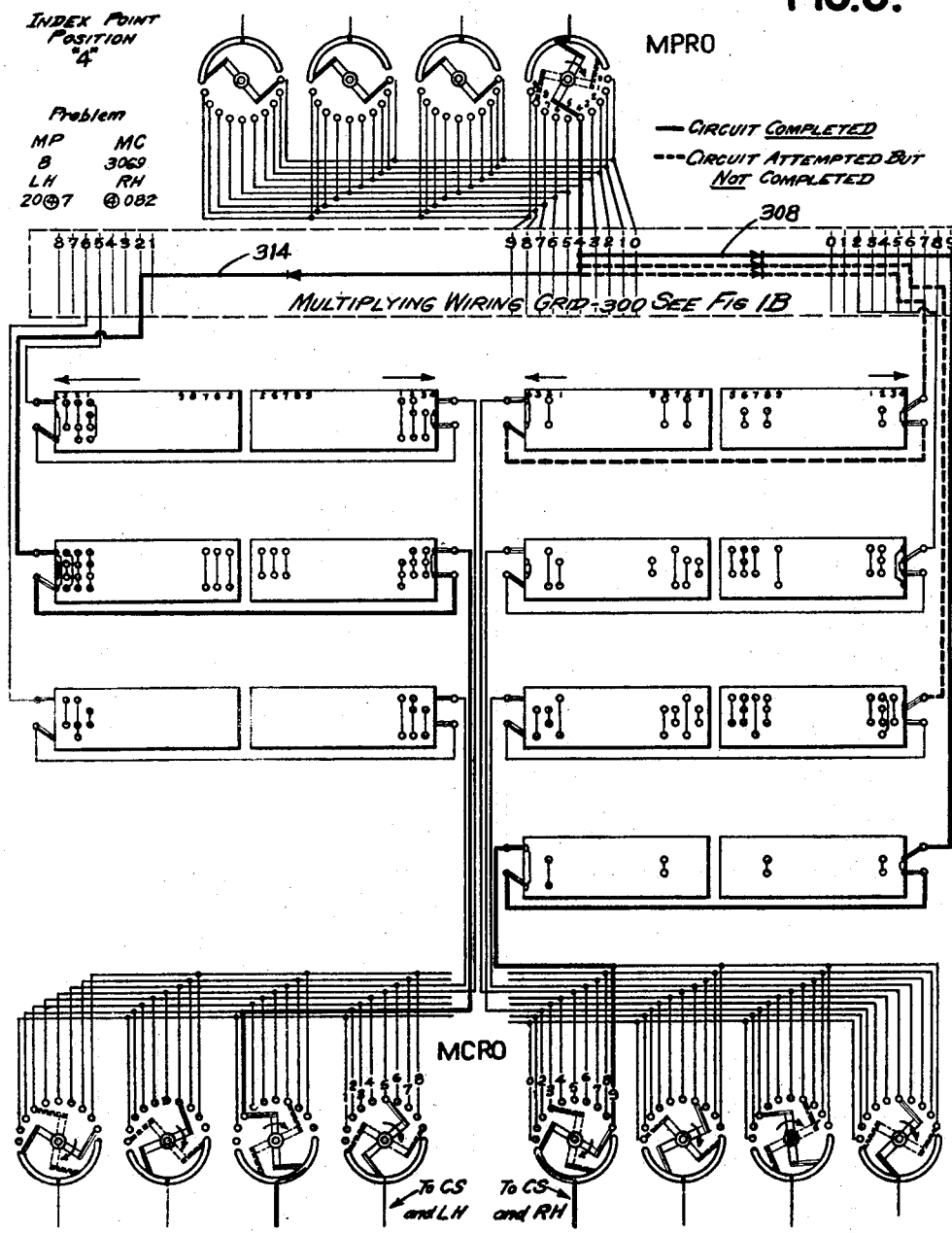

Arthur H. Dickinson
Inventor

Cooper, Kerr & Dunham
Attorneys

May 21, 1940.  A. H. DICKINSON  2,201,825
IMPULSE CREATING AND SELECTING DEVICE FOR ACCOUNTING MACHINES
Filed May 6, 1937  13 Sheets-Sheet 9

May 21, 1940.  A. H. DICKINSON  2,201,825
IMPULSE CREATING AND SELECTING DEVICE FOR ACCOUNTING MACHINES
Filed May 6, 1937  13 Sheets-Sheet 10

Inventor
Arthur H. Dickinson
Cooper, Kerr & Dunham
Attorneys

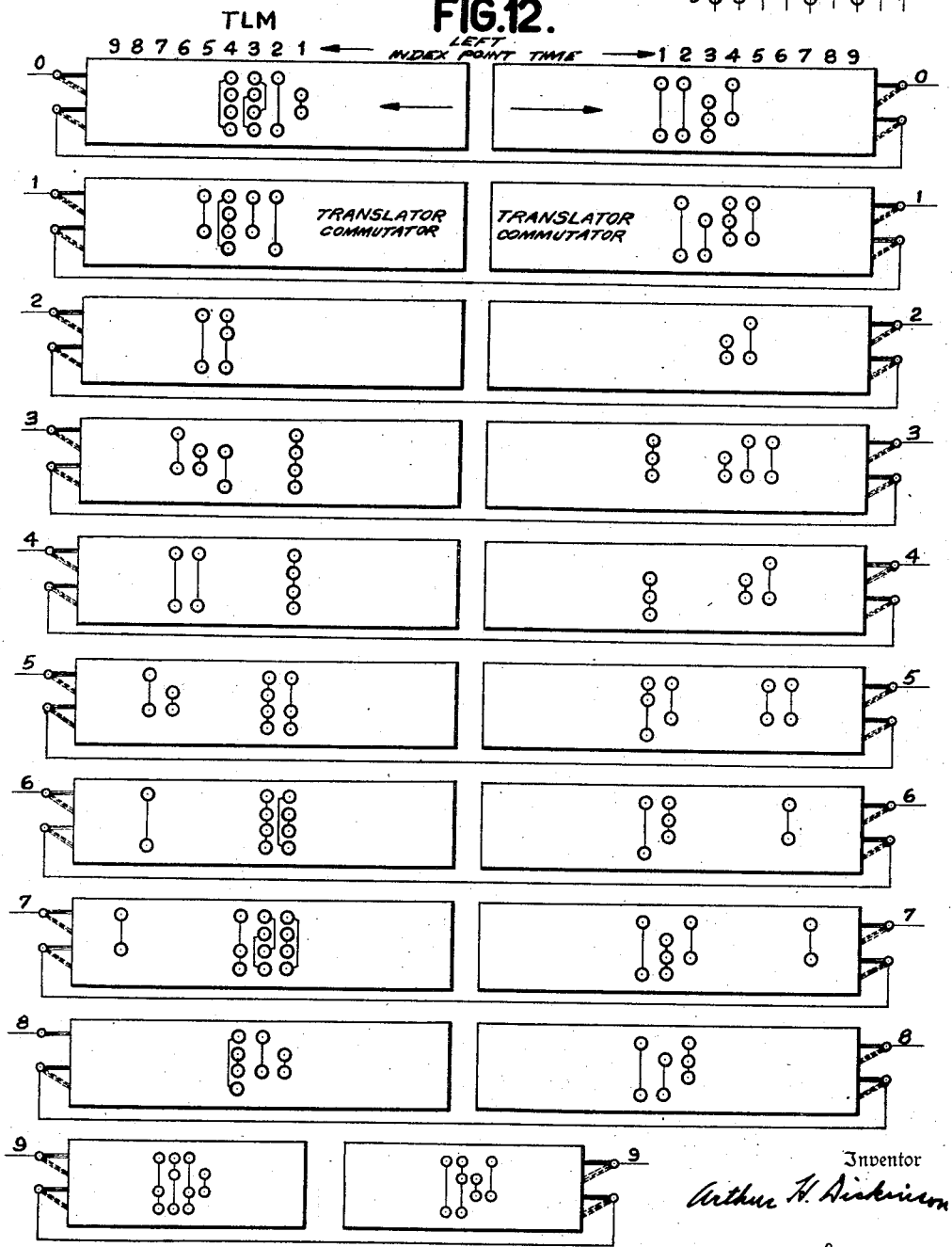

May 21, 1940.  A. H. DICKINSON  2,201,825
IMPULSE CREATING AND SELECTING DEVICE FOR ACCOUNTING MACHINES
Filed May 6, 1937   13 Sheets-Sheet 12
FIG.15.
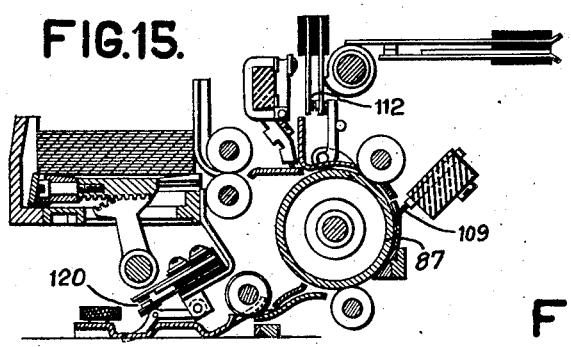
FIG.18.
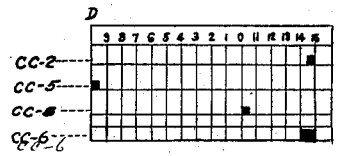
FIG.14.
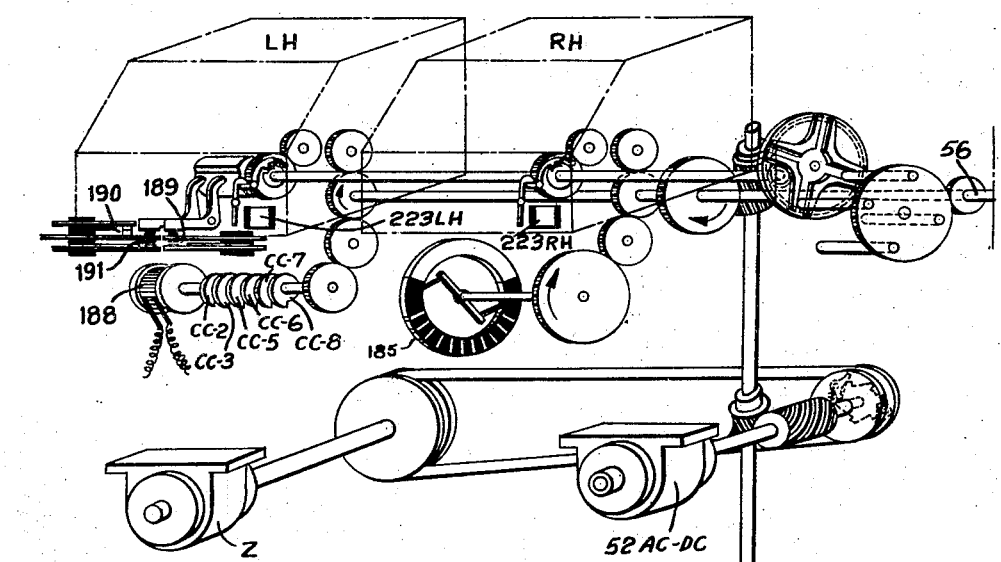
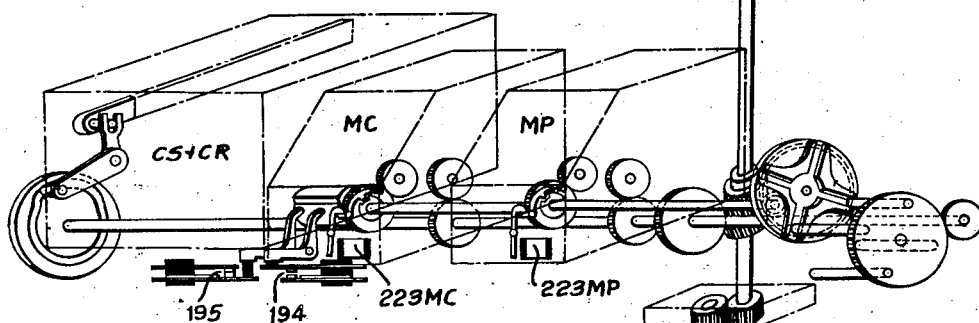
Inventor
Arthur H. Dickinson
Cooper, Kerr & Dunham
Attorneys

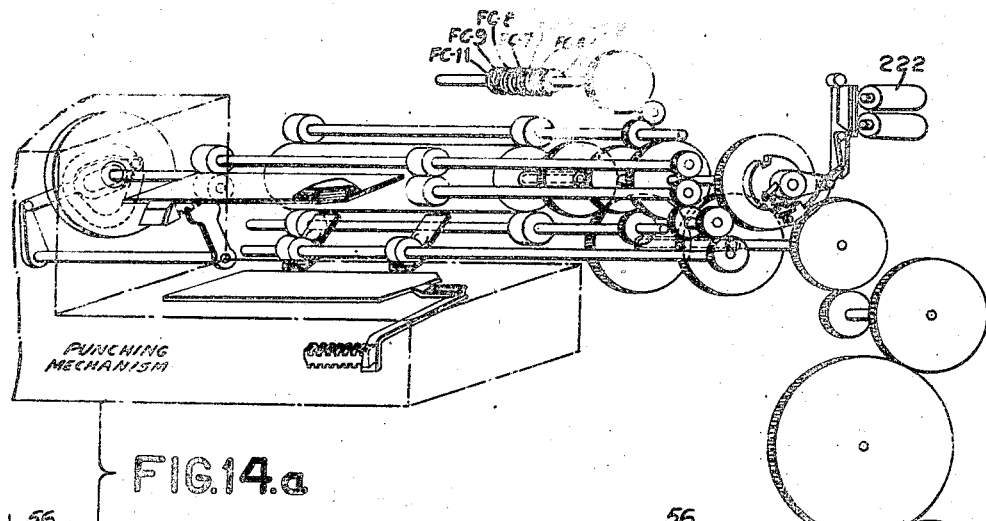
FIG.14.a
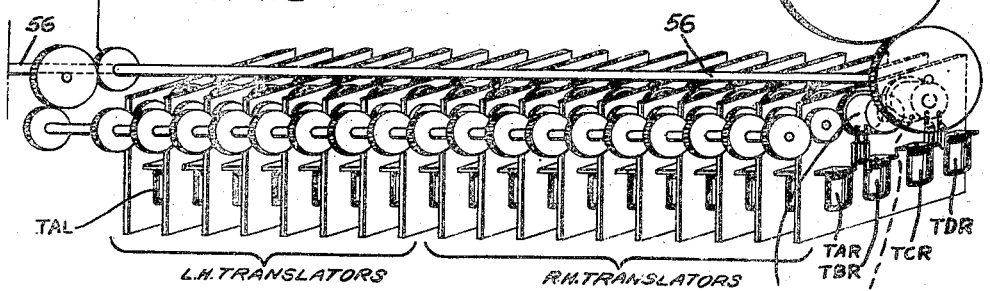
FIG.16.
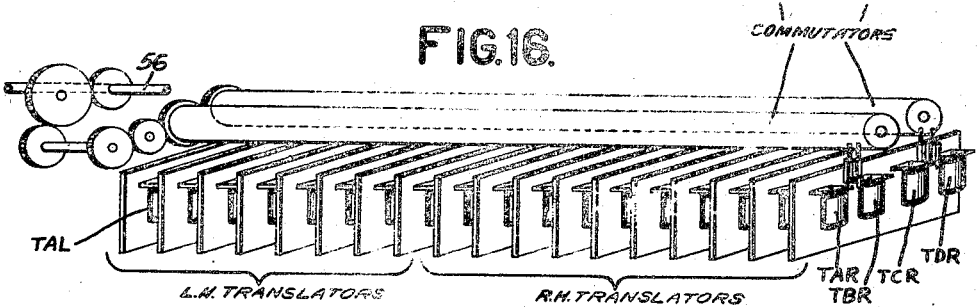
FIG.17.
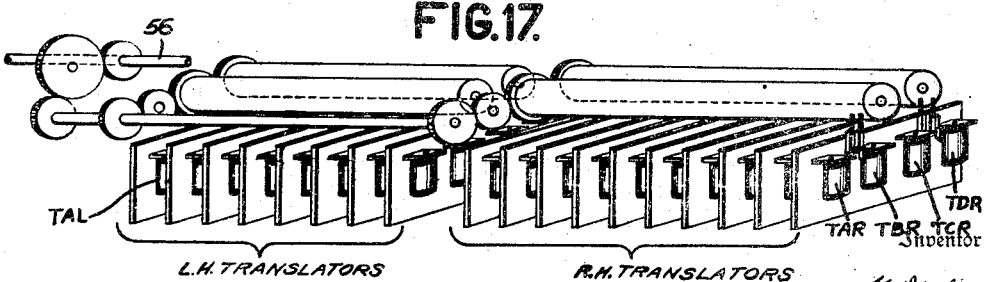

Patented May 21, 1940

2,201,825

UNITED STATES PATENT OFFICE 2,201,825

IMPULSE CREATING AND SELECTING DEVICE FOR ACCOUNTING MACHINES

Arthur H. Dickinson, Bronxville, N. Y., assignor to International Business Machines Corporation, New York, N. Y., a corporation of New York Application May 6, 1937, Serial No. 141,083

17 Claims. (Cl. 235—61.6)

This invention relates to improvements in multiplying machines and more particularly to improvements in such machines of the differentially timed impulse type.

One of the objects of the present invention resides in the provision of novel means for creating and selecting the differentially timed product representing impulses.

According to the present invention the multiplier and multiplicand entry devices are utilized as impulse emitters such devices being arranged to be maintained in a state of rotation during computing cycles instead of being at rest or static as heretofore. Fixed wiring of special form defining a multiplying grid is disposed intermediate the readout devices of the entry means and associated with such wiring are vagrant circuit interrupting and preventing means such as translators and one-way circuit controllers such as cuprous oxide rectifiers.

Accordingly further objects of the present invention comprise the provision of novel means for applying distinctive characteristic impulses and controlling the selection of partial product representing impulses wherein both the applying and selecting elements are maintained in motion during the applying of distinctive characteristics to the impulse and the selecting operations.

A further object of the present invention comprises the provision of a multiplying machine construction wherein the multiplier and multiplicand entry means are utilized both for the receipt of entries and for the creation and selection of product representing impulses based upon said entries.

A further object of the present invention resides in the provision of a multiplying machine construction wherein there is a direct and continuous circuit path for impulse flow from the multiplier entry readout means through a multiplying wiring grid, translators and through the multiplicand readout devices to outgoing result lines.

A further object of the present invention resides in the provision of a construction for multiplying machines in which the brushes of the multiplier and multiplicand readout devices by rotating to and from an original set up position effect both impulse selection and emission with a further selection by way of suppression of undesired impulse flow being effected by translators whose brushes are combinationally positioned in accordance with the digital amount of one of the factors, for example the multiplier.

Another object of the present invention resides in the provision of a construction wherein according to one embodiment the rotatable impulse distinctive characteristic applying and selecting devices rotate with a fixed differential relationship and wherein according to another embodiment the devices rotate with a differential relationship which is constantly varying during calculating cycles.

A further object of the present invention resides in the provision of a construction wherein the intermediate circuits between the multiplier and multiplicand entry means transmit a plurality of progressions.

A further object of the present invention resides in the provision of a construction in which differentially timed emission of impulses is caused directly at the MP entry receiving device, the impulse emission being modified and controlled directly by the MC entry device.

A further object of the present invention resides in the provision of a construction wherein impulse emitting and selecting means and cooperating circuits are provided and in which digit representing impulses are potentially impressed by one impulse emitting means upon circuits in a shiftable relation and wherein such circuits lead to a progression coordinator preferably in the form of multiplication wiring grid, which coordinator coordinates impulse flow into a multiplicity of progressions, certain of which are unwanted in the particular computation and one progression which is based upon a factor amount being wanted in the computation and wherein other circuits are provided receiving the impulses arranged as to wanted and unwanted progressions and wherein means are provided for rejecting the unwanted progression impulses and wherein other selecting means are provided to select impulse flow according to the digits of the other factor of the computation, such last mentioned impulse selecting means cooperating with the first impulse emitting means to time the emission of impulses and to receive the impulses to be selected in a shiftable relation from the input circuits.

A further object of the present invention resides in the provision of a construction wherein dual impulse emitting means are provided with progression coordinators therebetween so arranged that impulse flow is caused to occur upon the coincidence of terms of progressions which are respectively based upon the digit values entering into the computation.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

The present application constitutes a continuation in part of my copending application, Serial No. 29,825, filed July 5, 1935.

In the drawings:

Figs. 1A, 1B, 1C and 1D, taken together and arranged vertically in the order named, show a circuit diagram of one embodiment of the present invention incorporated in a multiplying machine;

Fig. 2 shows the wiring arrangement for the translators and the disposition of the spots on the translator commutators which are used in cooperation to select right hand component impulses;

Fig. 3 shows the combinational code utilized with the translators of Fig. 2;

Fig. 6 shows a simplified partial wiring diagram including the constantly rotating MP and MC entry device readouts, and the associated translators and shows the circuits which are completed for a particular multiplication problem at a given index point time in the operation of the machine;

Figure 7:
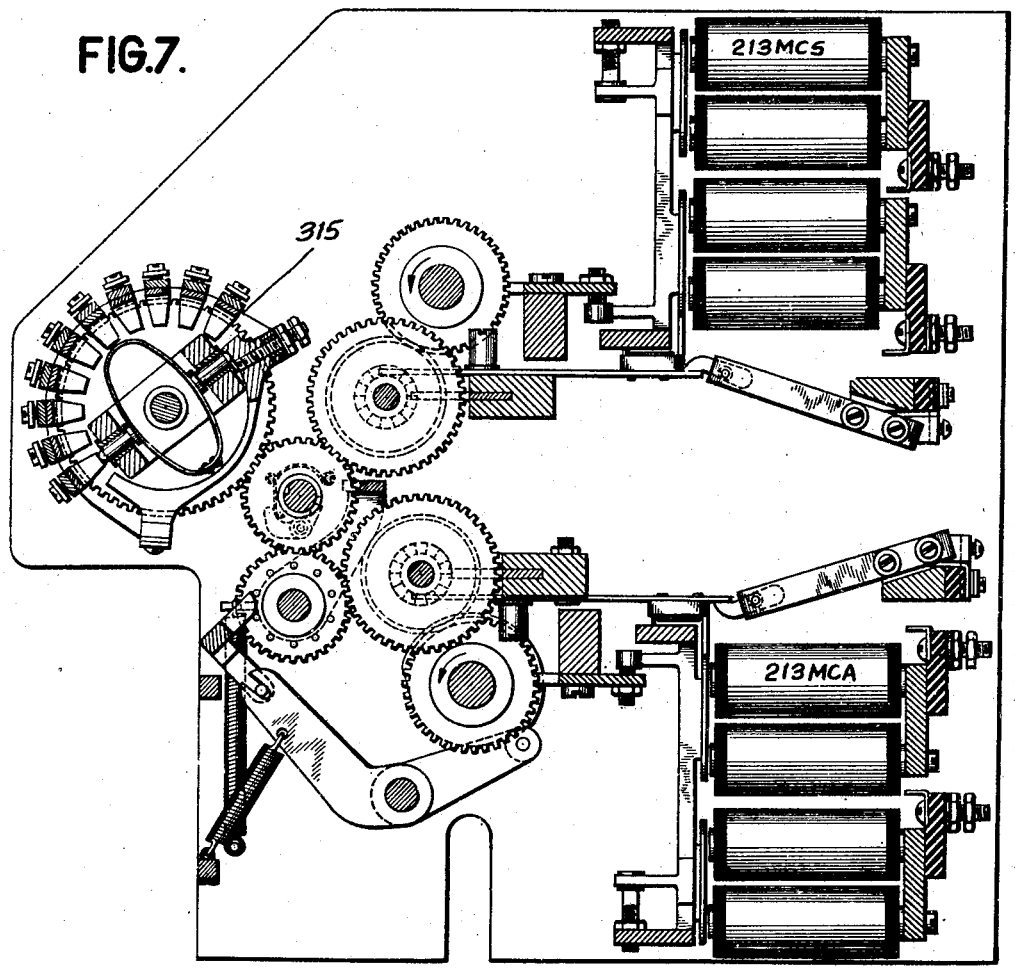
Fig. 7 shows a multiplicand entry device used in an alternative embodiment of the invention.

According to the embodiment of the invention shown in Figs. 1A to 1D inclusive, the multiplier and multiplicand entry devices during the computing operation of the machine constantly rotate in the same relative direction. According to an alternate embodiment of the invention one of these entry devices is arranged to rotate in a relatively opposite direction to the other and Fig. 7 shows the structure required to produce such relative opposite direction of rotational movement.

Figure 1A:
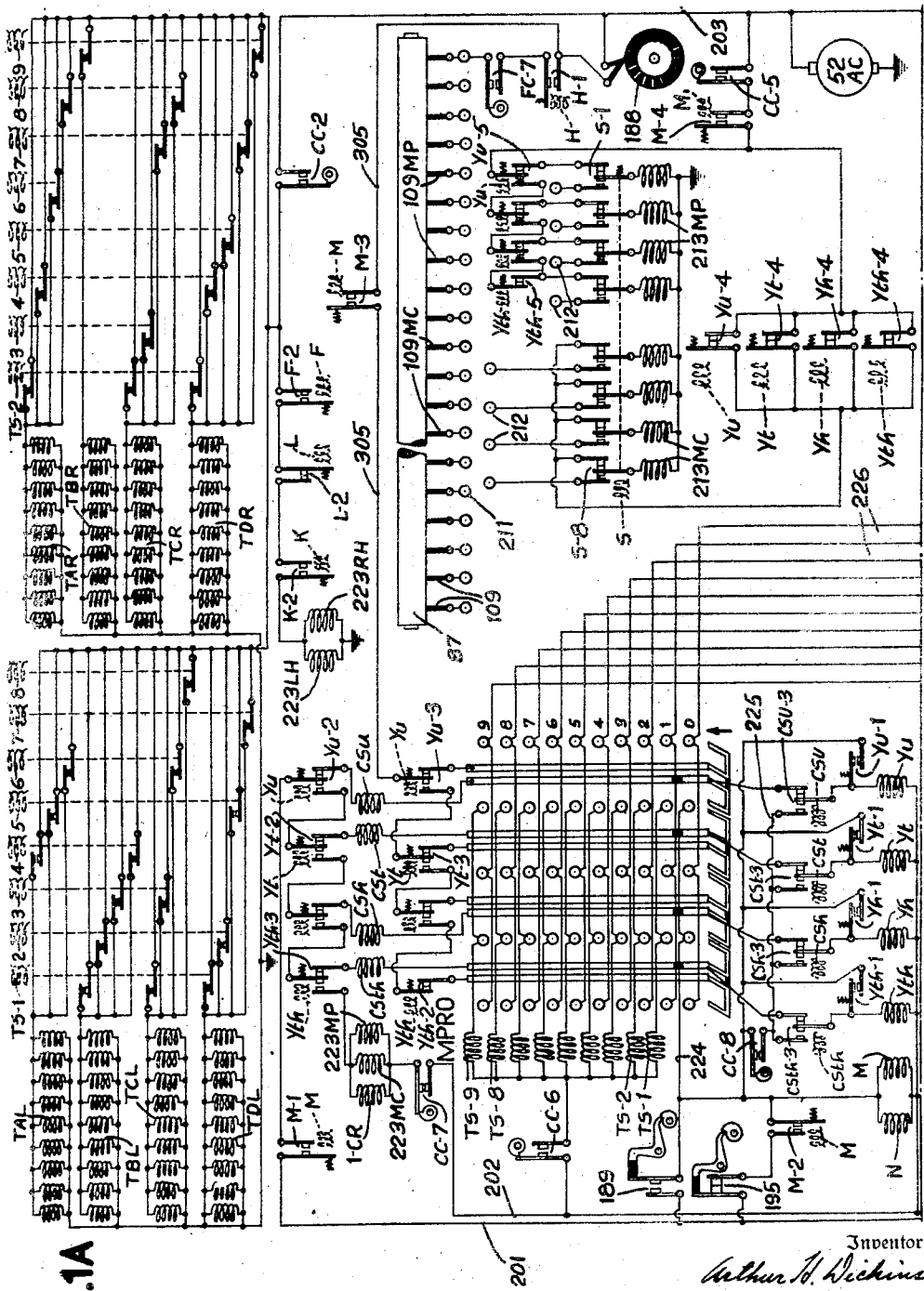
Figure 8:
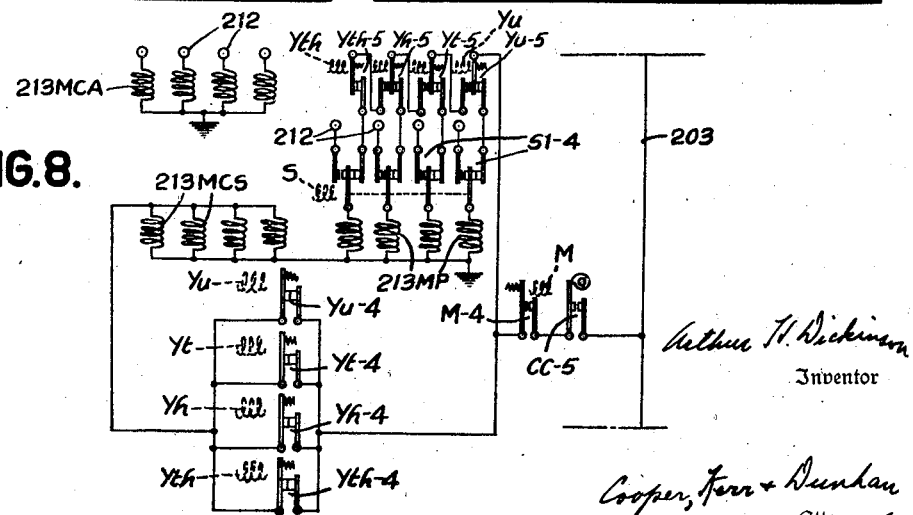

Fig. 8 shows the modifications necessary in a portion of the circuit diagram of Fig. 1A which are required with the different embodiment of the invention wherein the direction of rotational movement of the two entry devices is in relatively opposite direction in place of being in the same direction as in the former embodiment.

Figure 1B:
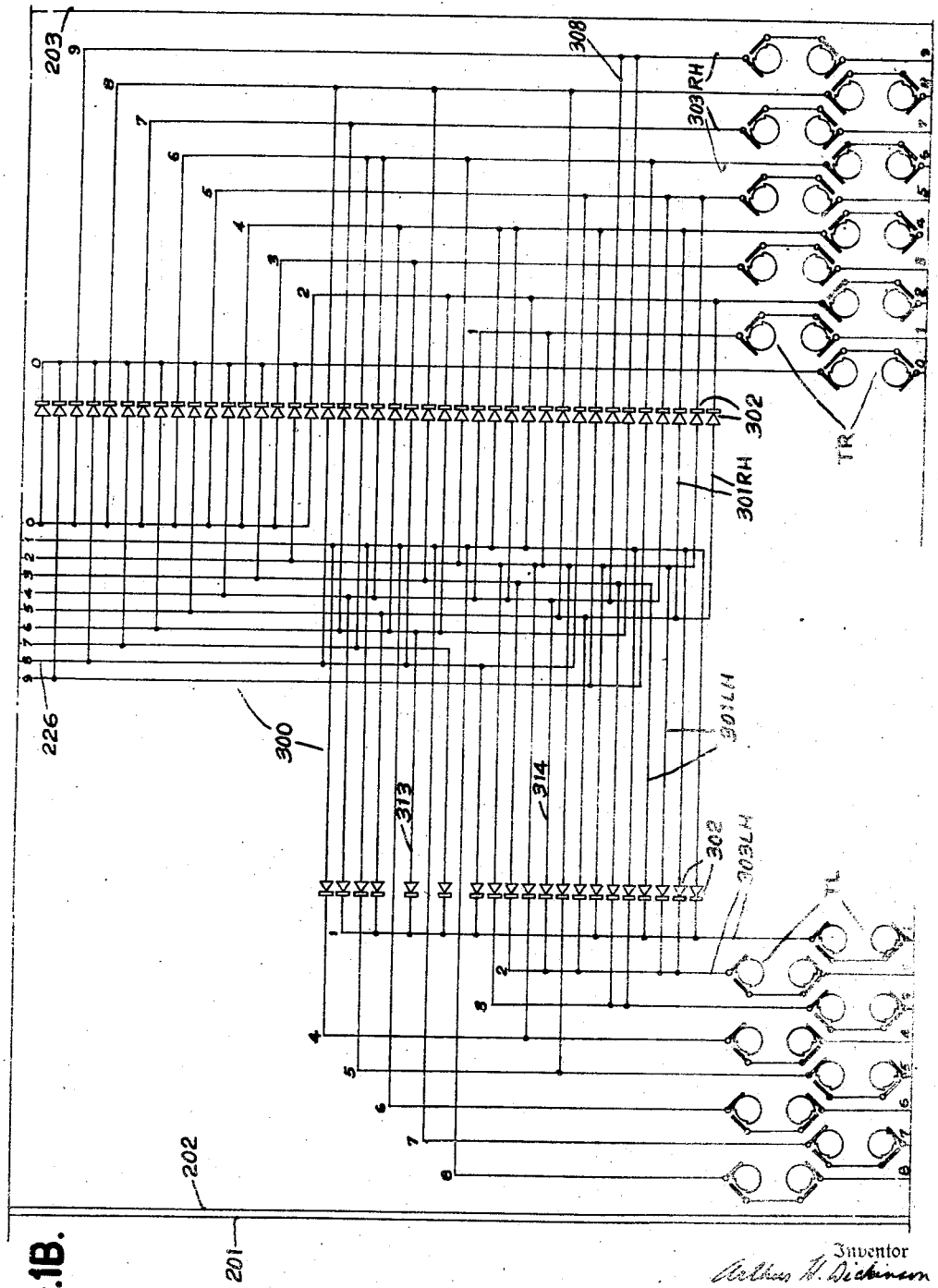
Figure 1C:
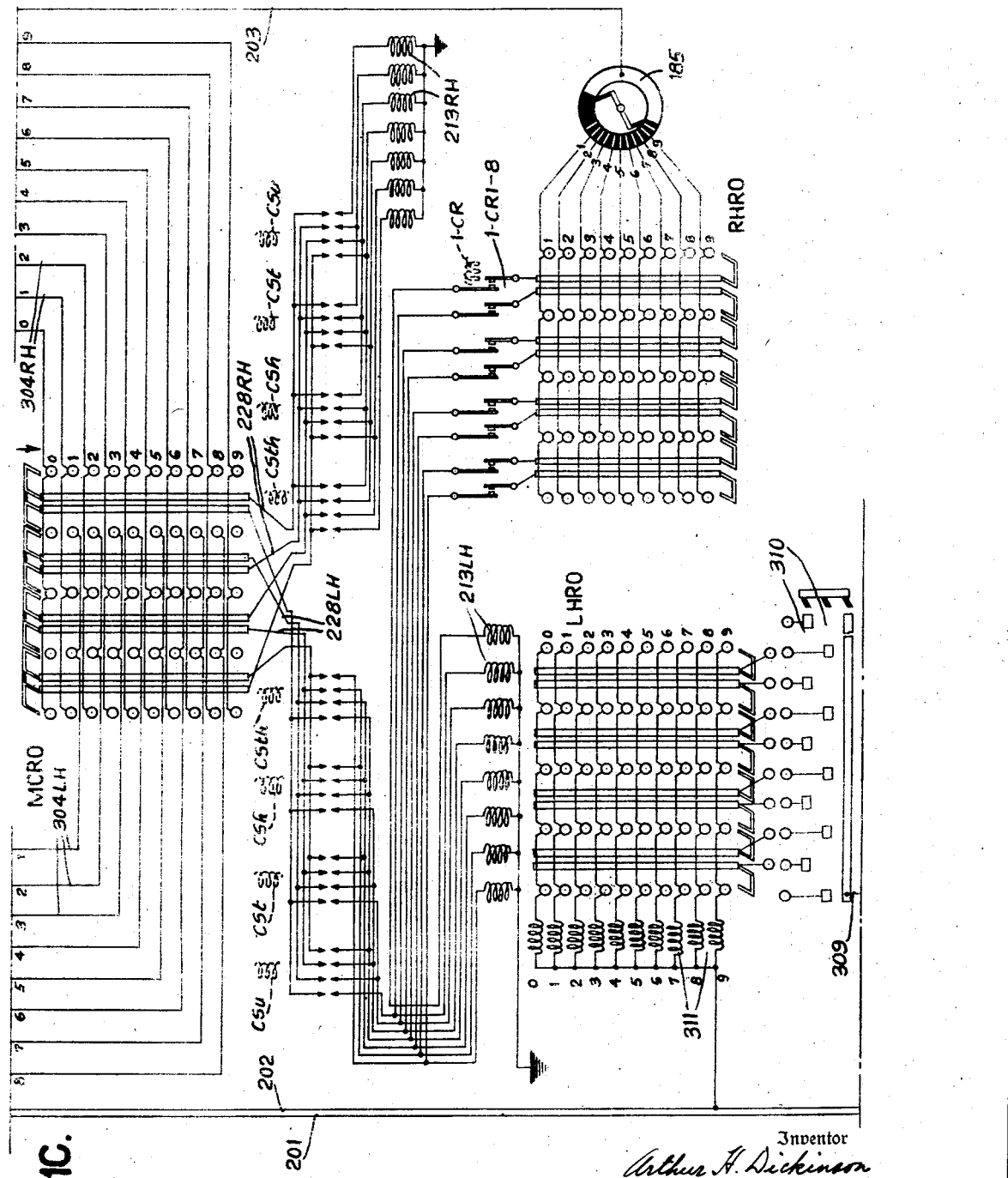
Figure 9:
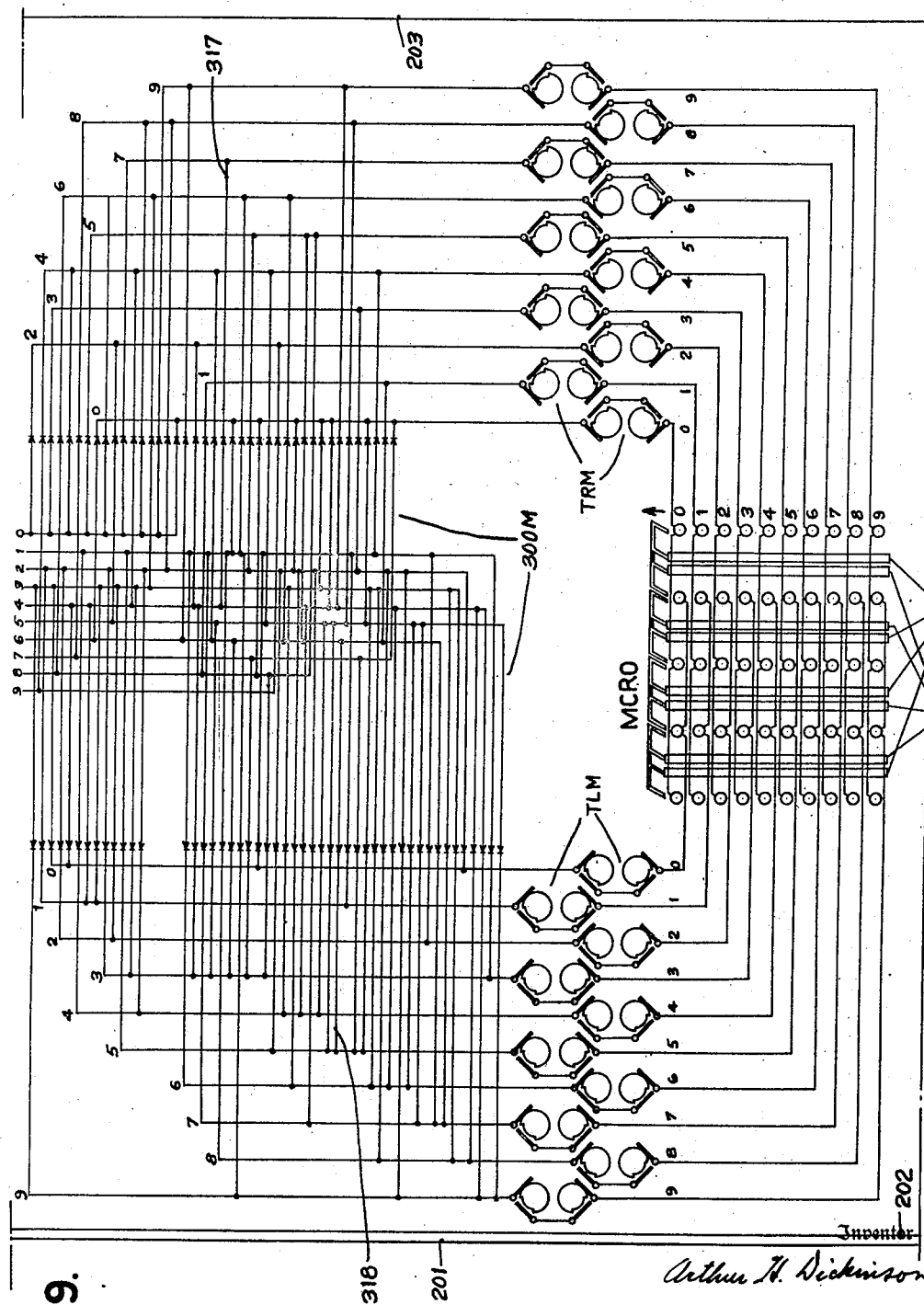

Fig. 9 shows modifications in the wiring, particularly in Fig. 1B and in the upper part of Fig. 1C, which are required for the alternate embodiment of the invention. In the latter embodiment of the invention the complete circuit diagram would be as follows:

Fig. 1A would have its lower right hand portion modified according to Fig. 8. Below Fig. 1A thus modified, would be placed Fig. 9, which figure incorporates also the upper part of Fig. 1C. The balance of Fig. 1C would then follow vertically below, in turn followed by Fig. 1D, which would complete the circuit diagram for the alternate and different embodiment of the invention.

Figure 11:
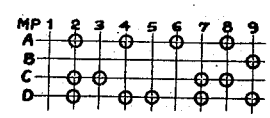
Figure 10:
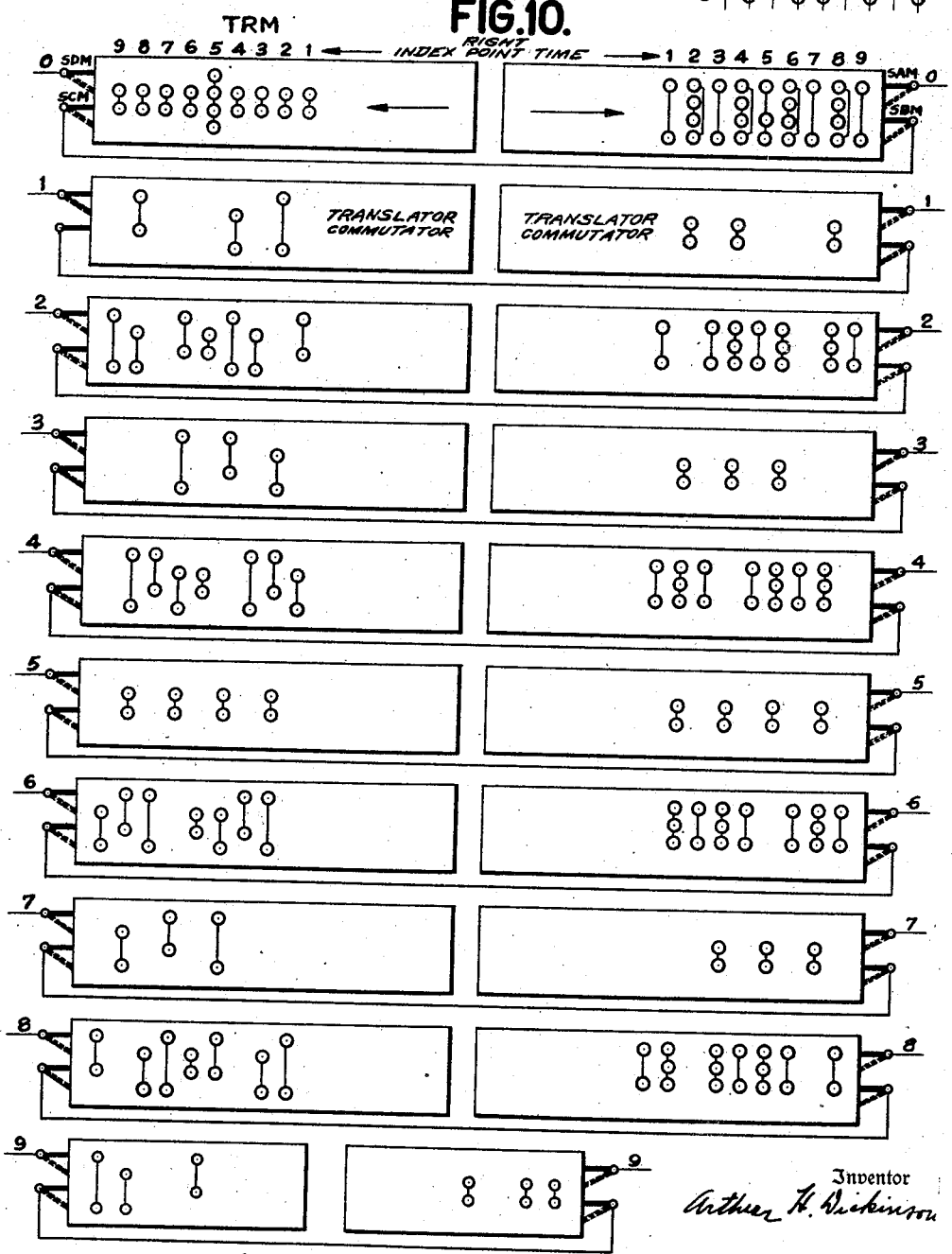

Fig. 10 shows the translators, the wiring of the commutator spots, etc. which are utilized for right hand component impulse coordination with the alternate embodiment of the invention;

Fig. 11 shows the combinational code utilized with the translators of Fig. 10;

Fig. 12 shows the translators, the wiring of the commutator spots, etc. which are utilized for left hand component impulses with the alternate wiring diagram; and Fig. 13 shows the combination code utilized with the translators of Fig. 12;

Figs. 14 and 14a, taken together with Fig. 14a to the right of Fig. 14, show somewhat diagrammatically the structural arrangement of the devices of the instant machine and the manner of drive of such devices;

Fig. 15 is a sectional view showing the card handling and feeding section of the machine and the sensing means;

Figs. 16 and 17 show diagrammatically various modified arrangements of translator commutators;

Fig. 18 is a timing chart showing certain of the cams of the instant machine in relation to another cam appearing in timing diagrams of the prior art.

Heretofore in the multiplying machine art, the general practice has been to utilize static entry receiving devices for the multiplier and multiplicand and with such entry devices, to control the creation and selection of partial product representing impulses, emitters and multiplying relays have been used in cooperation with such static entry devices. According to the present invention the entry devices themselves, in place of being of the static type, are of a rotatable type so that the readout devices for the entry devices can be utilized to act as emitting means for emitting the impulses. Briefly, multiplier and multiplicand entries are set up in the entry devices as heretofore by an entering operation controlled from a record card. Thereafter in place of leaving such entry devices in static condition they are put in rotation during each computing cycle so that the brushes of the readout devices are in rotation during computing cycles. Such entry devices have their readout circuits generally arranged in the following way. The outgoing lines from the MP readout extend to a multiplying grid comprised of static parts. From this grid certain lines pass through translators and from the translators the lines lead into the input sides of the MCRO readout. From the output sides of the MCRO readout lines lead to the product accumulating means.

The machine to which the present invention is shown applied is of a type well known in the art and for this reason no mechanical description of the same is necessary. Reference may be had to the United States patents of Cunningham, No. 1,933,714 and Oldenboom, No. 1,944,665 and British Patent No. 428,793 for details of operation as to the mechanical arrangement of card handling card reading mechanism, accumulators and accumulator drive, punching devices, etc. The machine is generally shown in Figs. 14 and 14a wherein similar reference numerals are used to correspond with the showing on the circuit diagram (Figs. 1A to 1D).

According to the embodiment of the invention shown in Figs. 1A to 1D, the entry receiving devices for the multiplier and multiplicand in place of being of accumulative type, are of non-accumulating type, that is to say, the transfer devices are omitted therefrom. A typical type of mechanism which can be used for this purpose is shown in United States patent to Lake, No. 1,307,740, see also United States patent to Daly, No. 1,921,454, which shows such an accumulator in association with a conventional readout. As stated, however, the transfer devices would be wholly omitted from such entry receiving device.

According to the alternate embodiment of the invention, the multiplier entry device is of the type just described for the previous embodiment. The multiplicand entry device, however, is of a different type, being of the general form delineated in Fig. 7 which in its basic principles of operation corresponds to the accumulator shown in United States patent to Lake, No. 1,856,418.

Summarizing, according to the present invention the product accumulators for RH and LH components of products will be the same as the accumulator of the Daly patent No. 1,921,451 and are driven in the manner shown in Fig. 14. The MP and MC entry receiving devices for the Figs. 1A to 1D embodiment will be the same as the entry receiving devices in the Oldenboom patent except that transfer devices will be wholly omitted therefrom. Such entry receiving devices will be driven in the manner shown in Fig. 14.

According to the modified embodiment of the invention, the MC entry device of the Oldenboom patent or of Daly, No. 1,921,454 will be replaced by the MC entry device illustrated in Fig. 7.

Figs. 14 and 14a show generally the structural relation of the parts of the instant machine and similar reference numerals are applied thereto to correspond to the reference characters used in the circuit diagram.

For details of the mechanical arrangement of translators, reference may be had to United States patent to Bryce, No. 1,880,409, which shows and describes complete details of the translators adapted for use in the present machine. Such translators are driven in the customary manner from the main accumulator drive shaft of the machine in such a way that the commutators of the translators make one complete revolution per counter cycle of the machine. The translators (Fig. 14a) receive their drive from the counter drive shaft 56. In lieu of utilizing individual commutators, common commutators may be provided, having the conducting spots disposed as shown for the individual commutators here delineated. Such common commutator arrangements will provide for the simplification of drive. If desired, a separate common commutator may be provided for left hand and right hand components, each commutator being individually driven from the main counter drive shaft, or if desired, a single common commutator may be provided having a left hand section and a right hand section. Such alternative arrangements are diagrammatically illustrated in Figs. 16 and 17.

Referring to Fig. 1A of the circuit diagram, 87 designates the contact roll past which cards containing the multiplier and multiplicand designating perforations are passed. Cooperating with this contact roll are sensing brushes generally designated 109, those designated 109MP being allotted to the multiplier and those designated 109MC being allotted to the multiplicand. The customary plug connections are made from sockets 211 to sockets 212 to provide for the entry of the multiplicand and multiplier amounts into the respective entry receiving devices. 213MC and 213MP designate the magnets for the multiplicand and multiplier entry receiving devices. The usual impulse distributor 188 is provided which times the emission of impulses received from the A. C. line 203 and directs the same to the contact roll 87, through relay contacts H—1 and cam contacts FC—7. The A. C. line 203 is fed from the A. C. generator designated 52AC. Impulse distributor 188 also times the impulses which are directed to and through the MPRO readout device. It may be explained that the impulse distributor 188 serves merely to cut down the duration of time of impulse flow to prevent arcing at contact spots on the contact roll or readout. This is its customary function of impulse distribution in machines of this class. The multiplier entry receiving device is provided with a readout section designated MPRO. The column shift and cycle controller circuits are of conventional form and need not be described in detail. The cycle controller and column shift controls herein shown are fully explained and described in United States patent to Daly, No. 2,045,437. The cycle controller comprises relay magnets $Yu$, $Yt$, etc., with control contacts $Yu$—1, $Yt$—1, etc., and contacts $Yu$—2, $Yt$—2, etc. The customary column shift magnets $CSu$ and $CSt$, etc., are provided, controlling contacts $CSu$—3, $CSt$—3, etc., and also controlling the closure of the multi-contacts shown on Fig. 1C for column shift purposes. The cycle controller includes the customary relays M and N. The pick-up circuit for the relay coils of the cycle controller including M and N is through LH reset controlled contacts 139. Contacts 195 are provided which are opened upon MC reset for breaking down the set up of the cycle controller. Reset controlling magnets 223MC, 223MP and 1—CR are provided as in the Oldenboom patent.

In lieu of utilizing the form of the MPRO readout shown in the Oldenboom patent, double sets of segment spots are provided in all columns of the readout including those columns of the readout of the Oldenboom patent which previously only were provided with zero spots. In lieu of extending the transverse bus wiring to multiplier relays as in the Oldenboom patent, two sets of transverse bus wires are provided, one set extending to translator selector relay magnets generally designated TS and individually designated TS—1 to TS—9 to correspond with the digit value of the multiplier bus. The other transverse bus wires of the MPRO readout are wired to extend through wiring here generally designated 226 which connects to multiplying grid wiring shown on Fig. 1B.

Referring again to the translator selector relays, these translator selector relays will be energized according to the digital value of the multiplier. For example if the multiplier is 8, the TS—8 relay magnets will be energized. The circuit through these relays is completed upon closure of cam contacts CC—6 from D. C. line 202. The D. C. generator 52DC (Fig. 1D) supplies buses 201 and 202 in the usual manner.

The translators used in the instant type of machine are of the four magnet type. As customary in the designations of translators, the different coils of an individual translator are designated A, B, C and D. Furthermore, in the instant machine there are provided one set of translators for cutting off certain unwanted impulse flow during right hand component emission and another set of translators for cutting off certain impulse flow during left hand component emission. The brush shifting magnets will accordingly be designated. That is, TAL, TBL, TCL and TDL will be the brush shifting magnets pertaining to the left hand component brushes and TAR, TBR, TCR and TDR will be those pertaining to the right hand component translator brush shifting magnets. The translator brushes themselves will be designated SA, SB, SC and SD. The selective operation of the translators can best be described by taking a typical problem.

Assume that the multiplier digit was 8, the TS—8 translator selector magnet would thereupon be energized and effect closure of the contacts associated therewith, viz. it would close one contact under TS—8 to the left to bring about the energization of the TCL translator brush shifting magnets. Energization of TS—8 would also effect closure of two contacts pertaining to right hand components and bring about energization of TAR and TCR. Such energization of the brush shifting magnets is brought about upon closure of cam contacts CC—2 (Fig. 1A).

Figure 5:
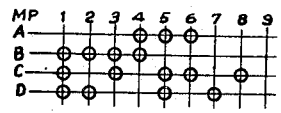
Fig. 5 shows the combinational code utilized with the translators of Fig. 4.

The coding arrangement for the translator selector relay contacts is shown in Fig. 3 for right hand components and on Fig. 5 for left hand components.

Figure 4:
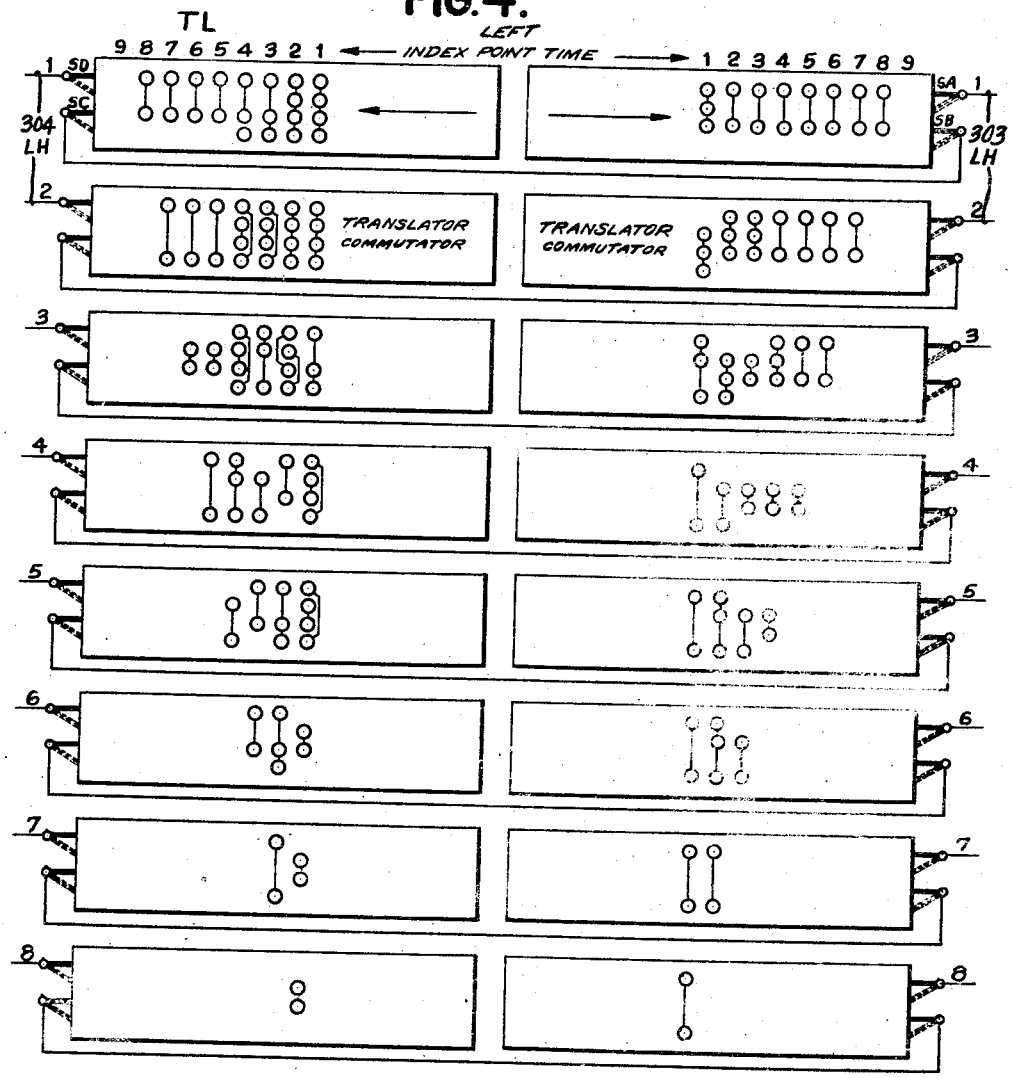
Fig. 4 shows the translators and the wiring arrangement of the commutator spots thereon which are utilized to cooperate in the control of emission of left hand component product impulses.

The translators have the usual shifting brushes designated SA, SB, SC and SD and shown on Figs. 2 and 4. In these figures the full line position of the brushes shows the normal position and the dotted line position shows the shifted position which is attained upon the corresponding translator brush shifting magnet being energized. The translator commutators are provided with spots wired as shown in Figs. 2 and 4. It may be explained that the purpose of the translators in the present machine is for preventing the flow of certain unwanted impulses and that the translators are not intended and do not act for impulse emission purposes.

According to the present invention and unlike previous machines, provision is made for putting the readout devices into rotation after the entry set up upon the entry devices and readouts. Such rotation of the readout entry brushes is effected in such a manner that the different readout brushes always return after one cycle of operation to the position at which they were originally set. For example, before a multiplier amount is entered the units order MP brush would stand on the zero index point position. With the multiplier digit in the unit order 8, 8 would be read from the card and at the end of the entry cycle the digit MP readout brush would stand on 8. At the beginning of the computing cycle, viz. one index point in advance of the 9 position, the units order 213MP counter magnet would become energized. The units order clutch will thereupon move the units order brush through 10 index point positions so that at the end of this cycle the brush would resume its position on the 8th segment spot.

As stated before, no transfer mechanism is provided in the MP and MC entry devices and accordingly there is a maintained setting of the brushes after moving through ten spaces. While this general mode of operation is maintained for both the MP and MC entry devices, it may be explained that in the MP entry device the brush movement takes place consecutively for different columnar orders, that is, on the first computing cycle the units brush would move ten spaces, on the next cycle the ten brush would move ten spaces and so on provided there were significant digits in the multiplier. If a zero appeared in the multiplier in any order, the corresponding brush would not move. In the multiplicand entry device on the other hand, brushes of all orders, whether they contain significant digits or not, move concurrently, that is, irrespective of whether the multiplicand contains zero in any order or orders all denominational order brushes of the readout will traverse through ten index point positions for each and every computing cycle. The manner in which this readout brush movement is secured will now be described.

Referring to Fig. 1A, the cycle controller relay magnets are provided with supplemental contacts designated Y$u$—4, Y$t$—4, etc., and also with supplemental three-blade contacts Y$u$—5, Y$t$—5, etc. The M relay of the cycle controller is likewise provided with supplemental contacts M—4, which are closed during computing cycles and open during all other cycles. Upon entry of multiplier and multiplicand amounts from a record card, the circuit to the 213MP and 213MC magnets is through contacts S—1 to 8, which are shifted to reverse position from that shown by energization of a relay coil S. Relay coil S is shown on Fig. 1D and the manner of its energization upon an entry cycle will be subsequently described.

The foregoing operation will have entered the multiplier and multiplicand amount on the respective entry devices. Upon a computing cycle pertaining to a significant digit of the units order multiplier relay contacts Y$u$—5 will be in non-shifted position under the control of the cycle controller. Upon closure of cam contacts CC—5 a circuit will be completed from the 203AC line, through CC—5, relay contacts M—4, through contacts Y$u$—5, through the S—1 relay contacts now in non-shifted position as shown and to the units order MP counter magnet. Cam contacts CC—5 are timed to close one index point in advance of the 9 index point position. To effect concurrent movement of all of the brushes of the MC readout, the following means is provided. A circuit is provided from the left hand side of the M—4 contacts leading through contacts Y$u$—4, Y$t$—4, etc., which are arranged in parallel, to another circuit which extends through the S—5 to S—8 contacts. Accordingly, with relay contacts M—4 closed, a current impulse would be supplied at the index point position one in advance of 9 to all of the 213MC counter magnets. Such circuit will be completed through one of the closed Y$u$—4, Y$t$—4, etc., contacts and through the S—5 to S—8 contacts which are in non-shifted position. The purpose of contacts Y$u$—4, Y$t$—4 is to prevent the imparting of ten increments of brush movement to the MC readout brushes in the event that there are all zeros in the multiplier and to also prevent giving such ten increment of advancing movement to the MC brushes at the end of a multiplying computation. At the end of such multiplying computations, all of the Y$u$—4, Y$t$—4, etc. contacts are in open position due to the control from the cycle controller.

The foregoing circuits provide for the concurrent ten increment of brush movement for the MC brushes and for successive ten increments of brush movement of the brushes of the MP readout device. If a multiplier were 808, the units order brush in MPRO would first be given ten increments of movement and inasmuch as zero is the multiplier in the tens order, no increment of movement would be given to the tens order brush but such increment would be given on the next computing cycle to the hundreds order brush of the MP readout device.

The cycle controller is also provided with supplemental transfer contacts Yu—3, Yt—3, etc. These contacts are provided to call into circuit only the rotating brushes of the multiplier which relate to significant digits of the multiplier. Expressed otherwise, contacts Yu—3, Yt—3, etc. are arranged so as to supply impulses only to such orders of the MPRO readout which are to be effective during a multiplying computation and omit the supply of impulses to orders of the readout which are not effective, being related to zero. Such transfer contacts Yu—3, Yt—3, Yh—3, etc. supply current impulses only to the orders which are effective in a multiplying computation and only at the time such orders are controlling multiplication order by order. For example, if 808 is the multiplier, Yu—3 would be in non-shifted position on the first computing cycle and during the second computing cycle Yu—3 and Yt—3 would be shifted and Yh—3 would be in non-shifted position. Accordingly, impulses would be put into the hundreds order of the MP readout only during such second computing cycle.

Reference has been previously made to the fact that the output lines 226 (Fig. 1A) extend to a multiplying grid generally designated 300 (Fig. 1B). From the multiplying grid wiring, output lines generally designated 301RH and 301LH extend through one-way cuprous oxide rectifiers generally designated 302, to other output lines generally designated 303RH and 303LH. It is on these outgoing lines 303RH and 303LH that the right and left hand component impulses flow from the multiplying grid 300. The circuit from lines 303RH is completed through translators generally designated as a group TR, signifying the translators for right hand components and the left hand component impulses flow through left hand component translators generally designated TL. From the respective translators, lines 304LH and 304RH extend to the segment spots of the MCRO readout, see Fig. 1C. From the multiplicand readout, impulse flow is via the customary lines designated 228LH through the column shift relay contacts and therethrough to the 213LH counter magnets. Similarly the right hand component impulses leaving the MCRO readout flow through lines designated 228RH, through the column shift contacts to the 213RH counter magnets.

As is customary in machines of this class, multiplication proceeds column by column of the multiplier under the control of the cycle controller and after multiplication is complete provision is made for gathering together all of the results into the LH accumulator. This is brought about under the control of the cycle controller in the customary manner when relay coil 1—CR (Fig. 1A) becomes energized. With this coil energized, relay contacts 1—CR—1 to 8 (Fig. 1C) become closed and with the emitter 185 in operation impulses will flow through the RHRO readout out via the transfer lines to the 213LH counter magnets. In this manner the amount of the right hand components will become added to the amount of the left hand components.

Having described the general circuit, the impulse emitting and selecting action will be more specifically described.

In the embodiment of the invention shown in Figs. 1A to 1D inclusive, the brushes of both the MP and MC receiving devices move in the same direction during the entry cycle and during the emitting or computing cycle. With the modified embodiment shown in Fig. 9 and with the entry receiving device of Fig. 7, the directions of rotation are as follows: Upon the entry cycle the brushes of the MP and MC receiving devices move in the same direction. On the emitting or computing cycle on the other hand, while the brushes of the MP device still move in the same direction as upon entry the brushes of the MC device move in a direction opposite to their direction of movement upon entry.

The principle of operation will be first described for an extremely simple multiplication, viz. 1×1. With MC and MP both 1, the units order brushes of MPRO and MCRO will stand on 1 after the entry cycle. On the first computing cycle both brushes will be put into rotation at the D index point position which is the index point one in advance of 9 and the product representing impulse will be an amount of 1 emitted at index point 1. On such computing cycle it will be understood that the brushes rotate a complete revolution or through 360 degrees of movement. On an entry cycle such brushes rotate a differential extent if there is an entry. Such impulse must flow through the multiplier and multiplicand brushes at the time when such brushes establish contact to segments having completed wiring in the multiplying grid and at a 1 index point position since the impulse required is 1. Accordingly, the multiplying grid wiring should be such that the zero segment spot of the units order of the MPRO readout should be wired to the zero spot of the MCRO readout in the units order since the units order brushes of the MCRO and MPRO readouts will also traverse the zero spot at the 1 index point position of time. Referring back to the circuit diagram, this wiring will now be traced including the circuit through the translators, which as explained before, are provided for cutting off vagrant impulse flow. As explained before, the units order brush of the MPRO readout on the first computing cycle will pass the zero segment spot at 1 index point position. A circuit will be accordingly completed as follows. Beginning at the 203AC line through the impulse distributor 188, via a wire 305, through relay contacts M—3 now closed and which are closed during computing cycles, through the Yu—3 contacts now in non-shifted position into the common strip of the readout pertaining to the units order, through the brush of this readout at the time it passes the zero segment spot which is at the 1 index point position of time, out by the zero line of the 226 group, down to the uppermost wire of the multiplying grid, out via the uppermost line of the 301RH group through the cuprous oxide rectifier down via the zero line of the 303RH group, to the translator which is in the zero line above mentioned, viz. the uppermost analyzer of Fig. 2. Referring to the code (Fig. 3), it will be noted that for a multiplier of 1, no translator brushes whatsoever are shifted. The brushes are therefore in the full line position. The impulse flows in through brush SD at the extreme left and at the "one" time in the cycle of operation of the right hand translator commutator, a circuit is completed to the SC brush, thence out via wire 306 to the SB brush in the full line position, thence through the commutator spots and wiring at the 1 index point position, out via the SA brush to a zero line of the 304RH group, to the zero spot in the units order of the right hand section of the MCRO readout, out via the brush which is traversing the zero spot at the I index point position of time since the entry in MC was 1 and down through the column shift contact to the units order 213RH magnet to enter 1 in the units order of such accumulator.

The mode of operation will now be traced with a more complicated problem. Let the problem be taken of multiplying 8 as the multiplier by 3069 as the multiplicand and consider only the multiplication of 3 as the multiplicand in the thousands order by 8 as the multiplier, and consider only the right hand component of this multiplication. 3×8=24 and 4 is the right hand component result desired. Emission therefore must take place at such time as to emit a 4 representing digital timed impulse. Recalling that the multiplier brush originally stood on 8, it will traverse the 4 spot at the 4 index point. The multiplicand brush, however, was initially standing on 3 and it will traverse the 9 spot at the 4 index point position in its rotation. This accordingly dictates a 4 to 9 wiring in the multiplying grid. This connection is shown at 308 in Fig. 1B and in a more diagrammatic manner by the heavy full line 308 in Fig. 6. From the multiplying grid wiring 308 the circuit extends down through the right hand components translator, entering the 9 section (Fig. 2). As shown in Fig. 6, a connection will be made through the translator commutator at the 4 index point of time and such connection will extend down to the 9 segment spot of the MCRO readout and thence out to the proper columnar order of the right hand components accumulator.

By the foregoing arrangement, emission of impulses takes place when the rotating readout brushes are in cooperation with the proper spots to emit the required impulses. Impulse emission is actually caused conjointly by the two readout brushes cooperating with electrically connected segment spots. Impulse emission depends upon coincidence of brush contact of the two readouts with segments which are wired together by the multiplying grid wiring and with proper completion of the circuits through the translators.

It is believed unnecessary to trace the flow of impulses for left hand components because the principle of operation is substantially the same.

The law of operation of the embodiment of the device just described may be explained as follows. The differential time of flow of an outgoing impulse from the MPRO readout over a given numbered bus line of the 226 group is based upon and equal to the difference between the value of the original brush setting in MPRO and the line value of the bus out of MPRO to which a given line of the 226 group is connected.

The differential time of flow of an incoming impulse into MCRO from a given numbered line of the 304 group (whether 304RH or 304LH) is based upon the difference between the original bus setting in MCRO and the MCRO bus line value of a given line. However, the time of the impulse which is desired to flow is always based upon the partial product component values which in turn is based on the original brush setting value of both MC and MP. Stated otherwise, the original brush setting value less the line value equals the differential time of impulse flow, which otherwise expressed, gives the following. Original brush setting value less the differential time of impulse flow for a required partial product component is equal to line value. There is a further qualification which is this—the original brush setting value must be increased by 10 if the partial product component is greater than the original brush setting. Accordingly, taking the original brush settings in MC and deducting the partial product component value, adding 10 if required, will give the ingoing line value into MCRO. Outgoing line values from MPRO can be similarly determined by taking the original brush setting in MPRO and deducting the partial product component value adding 10 if required. Thereafter having determined the line values going into MCRO and coming out of MPRO which are required in a given calculation connections are made in the multiplying grid wiring to provide for the desired complete circuit. This may be best explained by taking a specific example. Let it be assumed that 8 is the multiplier and 3 is the multiplicand. Computing now the outgoing line from MPRO value we will have the following: 8 is the original brush setting in MPRO. The required partial product component impulse is 4, 4 being the right hand component of 8×3. Accordingly, 8 less 4 gives 4 the outgoing line value in the 226 group. Now calculating the incoming line value for right hand components into MCRO will give the following: 3 is the original brush setting in MC. 4 is the required partial product component impulse. Adding 10 to 3 and deducting 4, gives 9, the incoming line value into MCRO. 4 was the outgoing line value from MPRO and 9 was the incoming line value into MCRO for right hand components. Accordingly, a multiplying grid wiring connection must be made between the number 4 line of the 226 group and the number 9 line of the 304RH group.

The following can easily be seen by referring to Fig. 6. In Fig. 6 the original brush setting was 8, i. e. the dotted line position of the brush for MP. The outgoing line value is 4 as shown by the full line extending up to the number 4 brush position.

Referring now to the multiplicand readout, the original brush setting is 3, the incoming line value is 9 and accordingly, a circuit has to be completed by the multiplying grid wiring as indicated at 308 between outgoing line 4 from MPRO and incoming line 9 into MCRO. The same kind of connections are utilized for left hand components. With the same typical computation of 8 as the multiplier and 3 as the multiplicand the left hand component is 2. This gives the following:

| 8 OBS | 3 OBS |
| −2 RI | −2 RI |
| 6 LV | 1 LV |

From the foregoing it will be appreciated that the 6 outgoing line of the 226 group must be connected to the one ingoing line of the 304LH group. Such connection in the multiplying grid wiring will be found and specifically designated 313 in Fig. 1B.

In Fig. 6, it may be explained that the heavy wiring to the left generally designated 314 is for a calculation involving 8 as the multiplier and 6 as the multiplicand. In this instance the required partial product impulse is 4 for the left hand component and this impulse, it will be noted, requires a 4—2 connection between the outgoing lines from MPRO and the incoming lines into the left hand side of MCRO. This multiplying grid connection will be seen to follow the above described rule, that is, 4 from 8 leaves 4 and 4 from 6 leaves 2, so that the 314 connection must be made from the 2 line to the 4 line.

The translators are provided for the following reason. Taking a typical multiplication of 1×1 we have the following:

| Index point position | MP Brush position | MC Brush position | LH X (wiring connection in grid) — (no grid connection) | RH |
|---|---|---|---|---|
| 9 | 2 | 2 | X | — |
| 8 | 3 | 3 | X | — |
| 7 | 4 | 4 | — | X |
| 6 | 5 | 5 | — | — |
| 5 | 6 | 6 | — | — |
| 4 | 7 | 7 | — | — |
| 3 | 8 | 8 | — | X |
| 2 | 9 | 9 | — | — |
| 1 | 0 | 0 | — | X |

From the foregoing it will be seen that in multiplying 1×1, unwanted LH component impulses will be emitted at the 8 and 9 index point positions, and unwanted RH components will be emitted at the 7 and 3 index point positions. To suppress such unwanted emission, which emission would occur due to the wiring of the multiplying grid and which wiring is required for impulse emission on other multiplying computations, the translators are provided. These are arranged to be set so as to suppress the flow of unwanted impulses and to only allow wanted impulses to flow to the result lines.

Referring further to the foregoing table, the multiplying grid wiring for brush positions 2—2 is required on computations involving 8×8, and on the 3—3 brush positions the multiplying grid wiring is required on computations involving 7×7; 6×6; 5×5; and 4×4. Accordingly, by the use of translators set according to the value of the multiplier, impulse flow can be suppressed or permitted. In the illustrative table above, impulse flow would be suppressed for left hand components at the 9 and 8 index point positions for a multiplier of 1, and for RH components impulse flow would be suppressed at index point positions 7 and 3 and only permitted at index point position 1 when multiplying by 1×1. On right hand components it may be explained that at brush positions 4—4 multiplying grid wiring is required for 3×3 computations and 8×8 computations and at brush positions 8—8 multiplying grid wiring is required for 2×2; 4×4; 7×7 and 9×9 computations. At the 0—0 brush position multiplying grid wiring is required in multiplying 1×1; 5×5 and 6×6. The translators permit such 1 impulse to flow at such position in multiplying 1×1.

The translators as used in the present machine are not utilized for impulse emission purposes since the differential time of impulse emission is caused by the conjoint action of the MP and MC readouts.

In brief a particular translator control is to suppress impulse flow which would otherwise occur due to the wiring of the multiplying grid required for other computations.

According to the present invention the multiplier entry device acts as an impulse emitter, the different brushes come into action successively as the calculation proceeds and each brush attempts to impress digit representing impulses on the outgoing lines 226 from the MPRO readout. Such lines 226 extend to a multiplying grid 300 of fixed wiring type. This multiplying grid selects and arranges the impulses according to progressions including the progression based on the controlling multiplier digital amount. Such progressions are placed on the intermediate lines 303RH, etc. leading to the translator selectors and such translators suppress the flow of all progressions other than those based upon the controlling multiplier digit. The progression representing impulses then flow to the multiplicand readout and in such readout there is a further selection from the progressions based on the digital amount of the multiplicand in each columnar order. The multiplicand readout device further cooperates in effecting impulse emission inasmuch as impulse emission is effected conjointly by the action of the multiplicand readout devices and the multiplier readout devices.

Another characteristic of the present invention is that the digital impulses which are potentially impressed upon the outgoing lines 226 are not always impressed on the same lines, that is, a given 226 line may at one time receive a 1 digital impulse and at another a 2. The differential time value of the impulse which is potentially impressed on any outgoing line 226 depends upon the original multiplier brush setting or multiplier amount. Accordingly, lines 226 are changeable digital lines and shift according to the value of the digit in the multiplier.

Expressed otherwise, the function of the multiplying grid is to receive the potentially available digital impulses and to select and arrange these impulses into a great plurality of progressions including what may be termed a homogeneous or wanted progression based on the controlling MP digit and heterogeneous or unwanted progressions which may be based on all of the other digits. Such homogeneous and heterogeneous progressions then flow to the translators which suppress the flow of all of the impulses representing the heterogeneous or unwanted progressions. The translators permit the homogeneous or wanted progression impulses to flow on to the multiplicand readout at which point the final selection of impulse emission is made according to the amount of the multiplicand in each order.

A characteristic novel feature of the present invention is the following. Referring to the MP readout and the outgoing lines therefrom, impulse flow according to progressions based on the multiplier digit may occur upon any line of 226 group other than the line leading from the particular segment spot related to the multiplier digit. On MCRO and with incoming lines 304 impulse flow according to a progression based on the MC digit may occur on any line other than incoming lines leading to the segment spot pertaining to the MC digit. Furthermore, a given outgoing line from MPRO may have impressed upon it impulses representative of a plurality of progressions. The same feature applies to the incoming lines into MCRO. Between MPRO and MCRO multiple progressions flow on the same lines.

According to the present invention two impulse emitting means are provided which attempt to impress impulses through electrical circuit connections disposed therebetween and including multiplying grid wiring and means for preventing unwanted impulse flow. The emitters and multiplying grid wiring cooperate in creating selected terms of a progression based upon the digit value of the initial brush setting of one of the brushes of one emitter and the digit values of all of the initial brush settings of the brushes of the other emitter. With the grid wiring and the emitters taken alone certain unwanted impulses would also flow and the flow of such unwanted impulses is suppressed by the translator. Taking one column of the multiplier and one column of the multiplicand it is the initial differential starting position of each of the two brushes taken with the multiplying grid that causes the applying of distinctive characteristics to the impulses and the selection of the wanted and coinciding term of two progressions one based upon the initial position of one brush and the other based upon the initial position of the other brush. Thus

| MP= 6 | MP= 8 |
|---|---|
| 1×6= 6 | 1×8= 8 |
| 2×6=12 | 2×8=16 |
| 3×6=18 | 3×8=24 |
| 4×6=24 | 4×8=32 |
| 5×6=30 | 5×8=40 |
| 6×6=36 | 6×8=48 |
| 7×6=42 | 7×8=56 |
| 8×6=48 | 8×8=64 |
| 9×6=54 | 9×8=72 |

The coinciding term in the above is 48 which represents the impulses actually emitted. The 8th term in the progression of 6 is selected because the multiplicand is 8 and the 6th term of the 8 progression is selected because the multiplier is 6. The explanation need not be amplified to explain about the multiple progressions attendant upon a multiple term multiplicand.

Another peculiarity of the present machine is that while the zero spots of the MPRO and MCRO readouts are wired no impulse flow occurs if any order of the MC amount is zero.

Another characteristic of the present invention is that the wiring of the multiplying grid is such that the number of wiring connections is less than the total number of partial product representing impulses to be emitted. This is attained by utilizing certain common grid connections for transmitting impulses pertaining to the product of different MC and MP digits and in which case the impulses transmitted over the common line differ in time of emission.

Having described the general principles of operation of the first embodiment, the complete circuit diagram will now be described.

With the machine plugged up in the previously indicated manner and with cards in the supply magazine of the machine, the operator depresses the start key and closes start key contacts 196 (Fig. 1D). Closure of these contacts completes a circuit through relay coil C and through relay contacts G—1 now closed and through cam contacts FC—2. A stick circuit is established through contacts C—2 of the C relay and through cam contacts FC—8 now closed. Energization of relay C also closes relay contacts C—1 and a circuit is established to energize the card feed clutch magnet 222. This circuit is completed from the 202 side of the D. C. line through relay contacts F—1, in the position shown, through the card feed clutch magnet 222, through cam contacts FC—6 now closed, through stop key contacts 197 now closed, through relay contacts N—1 and C—1 now closed, through contacts P—1 of the punch now closed, to the other side of the D. C. line.

The start key is held depressed until after the second card feed cycle is initiated. At the end of the first card feed cycle, card lever contacts 112 are closed, causing energization of relay coil H, which closes relay contacts H—1 (Fig. 1A). As the second card feed cycle ensues, the card is carried past the brushes 109 and the amounts of the multiplier and multiplicand are read from the card and entered into their respective entry devices. It may be explained that during this entry cycle relay coil S becomes energized upon closure of cam contacts FC—9. Relay coil S remains energized during the time the card is passing the sensing brushes 109 and with this coil energized the S—1 to 8 contacts (Fig. 1A) are shifted to direct the entries of the mutiplier and multiplicand into their respective entry devices.

While there is a manual starting up of card feed for the initial card handling cycles, on subsequent card handling cycles card feed is automatically initiated. Accordingly, the hand initiating control is cut off after the initial card handling operations. Early in the second card feed cycle, cam contacts FC—11 (Fig. 1D) close to energize relay coil G and shift relay contacts G—1 to reverse position from that shown to interrupt the circuit to the start key contacts 196 but to maintain the circuit to cam contacts FC—2. The energization of relay coil G will also close relay contacts G—2 and establish a stick circuit for relay coils G and H either through the FC—2 cam contacts or through the card lever contacts 112.

The first card after being fed through the machine ultimately passes to the entering position of the punch closing card lever contacts 120, energizing relay coil F and shifting the F—1 relay contacts. On starting up the machine contacts P—1, P—3 and P—5 in the punch are closed. With P—5 closed, relay coil K will be energized and relay contacts K—1 closed. Upon the shifting of relay contacts F—1 and upon the closure of cam contacts CC—3, a circuit will be established to the punch clutch magnet 143, which circuit is completed through punch contacts P—3 now closed, and relay contacts K—1, which are now closed. The energization of the punch clutch magnet 143 will cause the closure of contacts 155 which become latched closed by a latch 156. In this way current is supplied to the punch driving motor Z—2. Card handling operations in the punch are then effected in the usual manner.

In the present machine the set up of the cycle controller is initiated by the reset of the LH accumulator. At the time this accumulator is reset the RH or right hand accumulator is likewise reset. The energization of relay coils F and K causes relay contacts F—2 and K—2 (Fig. 1A) to close. Upon closure of cam contacts CC—2 current flows from the 203AC line, through CC—2 now closed, through F—2 now closed, through L—2 now closed and K—2 now closed, through the 223LH reset magnet and the closed, through the 223RH reset magnet and back to ground. Energization of the 223LH and 223RH magnets initiates LH and RH reset and such reset occurs with the racks of the punch in extreme outer position. During LH reset the reset control contacts 191 (Fig. 1D) close and energize relay coil L, causing opening of relay contacts L—2 (Fig. 1A) and preventing a repetition of LH reset. Although relay coil L is only temporarily energized, a stick circuit is established for coil L through relay contacts L—1, which stick circuit is completed through punch contacts P—2 now closed.

The cycle controller is set up in the following manner. Upon LH reset a circuit is established from the 201 side of the D. C. line (Fig. 1A), through the reset contacts 189, through relay coils M and N and back to the 202 side of the D. C. line. Energization of M closes relay contacts M—1, M—2, M—3 and M—4. The M—2 contacts establish a stick circuit for the relay coils M and N through the multiplicand reset contacts 195 which are now closed. The M—3 contacts provide an impulse circuit supply for the MPRO readout during multiplying and the M—4 contacts complete a circuit to establish impulse supply to both the MC and MP counter magnets, such impulse supply being provided at the time cam contacts CC—5 close and under the control of the supplemental Y—4 and Y—5 contacts.

*Column skip and cycle controller*

The column skip and cycle controller are of the usual type fully described in United States Patent to George F. Daly, No. 2,045,437, dated June 23, 1936, except that supplemental contacts Yu—3, etc. Yu—4, etc. Yu—5, etc. are provided. It is sufficient to here state that if any brush of the multiplier readout stands upon a zero spot, the corresponding Y relay coil of the cycle controller will be energized. Current will flow in from the D. C. line 201, through the 195 reset contacts, through the M—2 relay contacts, via wire 224, through the zero spots of the MP readout device, then via the corresponding brush or brushes standing on the zero spot or spots, then through the respective normally closed three-blade contacts CSu—3 to CSth—3, through the related Y magnets and back to the 202 side of the D. C. line. Also connected to relay contacts M—2 is a line 225 which extends over and connects with the normally open contacts of the CSu—3 to CSth—3 control contacts. Such circuit is completed through cam contacts CC—8. The other side of the CSu—3 to CSth—3 contacts is wired back to their respective Y relay coils and therethrough to the other side of the D. C. line. Accordingly, when any Y coil is energized, due to a brush standing on a zero spot in its corresponding column, the energization of this particular Y relay coil will close its Y—1 stick contacts and this Y magnet will remain energized. Assuming that no zero appears in the units column of the amount entered upon the MP entry device but that a zero appears in the tens column and that a significant figure appears in the hundreds column there will be an energization of coils Yt and Yth. Contacts associated with these coils shift to reverse position from that shown in the circuit diagram. Yu—2, Yu—3, Yu—4 and Yu—5 will not have shifted and the corresponding Yh contacts will not have shifted.

The machine is now ready to multiply by the amount in the units order of the MP entry device and initiation of multiplication is effected as follows.

Energization of relay coil M closes relay contacts M—1, and following the setting up of the cycle controller, cam contacts CC—6 close and current flows from the 201 side of the D. C. line, through relay contacts M—1 now closed, through the Yu—2 transfer contacts in the position shown, down through the CSu relay magnet, out via the brush which is standing on say the 8 spot of the MP readout in the units order, out through the TS—8 translator selector relay magnet, through cam contacts CC—6 and back to the 202 side of the D. C. line. There is a concurrent energization of the CSu magnet and the TS—8 translator selector magnet. Energization of the translator selector magnet effects combinational selection of the translator brush magnets for shifting and on operation of the translators the proper brushes are shifted to control impulse flow through the translators. Shortly after translator magnet selection is effected, cam contacts CC—5 close and a circuit is completed through the M—4 relay contacts to energize the units order 213MP counter magnet. Such magnet becomes energized at the index point position preceding 9. Concurrently with its energization current flows through Yu—4 and Yh—4 which are both closed to concurrently energize all of the 213MC counter magnets. Thereupon the units order brush of the multiplier entry device and all of the brushes of the multiplicand entry device commence rotating in synchronism. Upon the matching of the circuits through the multiplying grid wiring and the translator controlling connections with the circuits through the moving brushes of both the multiplicand and multiplier readouts impulses will be emitted down through the path previously traced to the LH and RH accumulators.

In the present machine provision is made for deferring energization of the Y relay magnets during computing cycles under control of the various CS—3 contacts until computing is completed in a given cycle. This is effected by the provision of the cam contacts CC—8 wired as shown. During computing the contacts such as the three-blade contacts CSu—3 are in shifted position. Accordingly, when the units order brush contacts the zero spot during its rotation, no circuit can be completed which will prematurely energize the Yu magnet. Such energization is effected after computing under control of the shifted CSu—3 contacts and the CC—8 cam contacts.

Operations for further orders need not be traced, but it may be explained that under the control of the cycle controller and with a zero standing in the multiplier in the tens order, upon the next following counter cycle the hundreds order 213MP counter magnet will become energized at the index point position preceding 9, and concurrently with its energization, all of the 213MC counter magnets will again become energized.

After multiplication is complete the transfer circuits in the cycle controller will all be shifted so that there is an ultimate circuit path from the 201 side of the D. C. line through relay contacts M—1, through all of the shifted Y—2 set of transfer contacts, through the 1—CR relay coil and through the 223MC and 223MP reset magnets, which circuit is established at the time the CC—7 cam contacts close. Energization of the 223MP and 223MC reset magnets initiates reset of the MP and MC entry devices. Energization of relay coil 1—CR brings about closure of related contacts 1—CR—1 to 8 (Fig. 1C) to connect the RHRO readout with the transfer lines. Accordingly, upon the operation of the emitter 185, impulses are emitted through the RHRO readout through the 1—CR—1 to 8 contacts over the transfer lines to the counter magnets 213LH of the LH accumulator. In this way the amount previously in RH is transferred to the LH accumulator in proper columnar relation to form the complete product amount.

MC and MP reset occurs concurrently with RH to LH transfer and MC reset opens contacts 195 (Fig. 1A) to break the stick circuit for relay coils M and N and for all of the Y relay coils. During MC reset, reset contacts 194 (Fig. 1D) become closed to energize relay coil C. Energization of coil C causes closure of relay contacts C—1 and there is a new energization of the card feed clutch magnet 222 through the circuit path previously traced.

Shortly after a new card feed is initiated, cam contacts FC—4 (Fig. 1D) close, energizing relay coil B, causing closure of relay contacts B—2 to maintain coil B energized after contacts FC—4 open. The stick circuit for coil B is completed through the LH reset contacts 190 now closed. The energization of coil B closes relay contacts B—1 and a circuit is completed through the escapement contacts 154 of the punch, via wire 309 to the readout device of the punch, generally designated 310. The brush of the readout strip will be standing on the first column at which punching is to commence and the punch selector magnets 311 will be energized in the customary manner under the control of the LHRO readout to control product punching. Energization of such punch selector magnets will, under interposer action, effect closure of punch contacts 312 to cause the energization of the punch magnet 237 (Fig. 1D). Punching continues until the card reaches to beyond the last column position in the punch, at which time punch contacts P—5 become closed to energize relay coil K, thereby effecting closure of relay contacts K—1 and energizing the eject magnet 151 in the punch (see Fig. 1D). The punched card is thereupon ejected from the punch and upon such eject action punch contacts P—3 close to effect energization of the punch clutch magnet 143 when cam contacts CC—3 close. This will present the following card to punching position and a new operation will then be performed.

*Modification*

It will be recalled that with the previously described embodiment, the multiplicand entry device brushes were set in rotation during calculating cycles and the multiplier entry device brushes were likewise set in rotation successively order by order and that the relative direction of rotation of the brushes in the MC readout device and the MP readout device was the same. This means that the brushes rotated during calculating cycles with a constant differential difference between the position of the MP brush and the position or positions of the MC brush or brushes. Thus, if the original brush position in an order of MC was 2 and the original brush position in an order of MP was 8, the constant differential difference was 6, and such 6 difference was maintained during the rotation of the brushes of both entry devices. It will also be appreciated that several differential differences may exist between the single MP brush and the different MC brushes when the different MC brushes are differentially set initially upon entry. Such constant difference of position will, however, be maintained during calculating because the brushes of both devices rotate in relatively the same direction.

According to the modified embodiment of the invention provision is made whereby the brushes of the multiplicand entry device may rotate in an opposite direction with respect to the direction of rotation of the brushes of the multiplier readout device. For this purpose a different form of multiplicand entry device is provided. This multiplicand entry device is generally of the form shown in Lake Patent No. 1,856,418. In this Lake patent provision was made for directing entries into an accumulator and turning the accumulator wheels either forwardly or reversely by utilizing two sets of accumulator magnets, selectively energized for operation according to the direction of rotation desired of the accumulator wheels and driving said accumulator wheels by separate sets of clutches, the gearing being so disposed that one set of magnets when energized caused the driving of the accumulator wheels in one direction and the other set of magnets causing the driving of the accumulator wheels in the opposite direction. A substantially similar arrangement is shown in Fig. 7, except that all transfer devices are omitted from the entry receiving device, since the same are not necessary and have to be omitted to eliminate the possibility of transfers during successive calculating cycles. With the arrangement shown in Fig. 7, in place of having one set of multiplicand entry receiving magnets, two sets are provided designated 213MCA and 213MCS. Magnets 213MCA when energized cause the positioning of the entry wheels in a forward direction and magnets 213MCS when energized, cause the reverse positioning of the entry device wheels. A readout device, generally designated 315, is of a type known in the art and adaptable for rotation in either direction.

When the alternate embodiment of the invention is employed a portion of the circuit shown in Fig. 1A is modified to include the two sets of accumulator magnets. As shown in Fig. 8, the 213MCA magnets are wired to the plug sockets 212 and these magnets become energized when the multiplicand entry is received from the card. During calculating cycles, the 213MCS magnets all become concurrently energized at one index point before 9 during calculating cycles. The manner of energization of these magnets is the same as for the 213MC magnets in the previously described embodiment, that is, they are energized through Y$u$—4, Y$t$—4, Y$h$—4, Y$th$—4 contacts and the circuit associated therewith through M—4 and cam contacts CC—5.

The foregoing arrangement, it will be understood, will, during calculating, cause the multiplicand entry receiving device and its associated readout to be rotated in a reverse direction with respect to the direction of rotation upon entry and in a reverse direction with respect to the direction of rotation of the multiplier entry receiving device upon such calculating operations.

With such relative reversal of direction of rotational movement the brush setting of the rotating MP brush does not differ from the MC brush setting with a constant difference as in the previous embodiment, but it differs by a constantly varying difference.

With such modified arrangement, it will be appreciated that a different interrelation of wiring is required, particularly the wiring in the multiplying grid. This modified multiplying grid wiring is shown at 300M in Fig. 9. The translator commutator spots are also differently disposed and wired than in the previous embodiment. While the code for the RH translators and the LH translators is the same, the interrelation of the spots and wiring on the commutators is different and the relation of such spots and wiring is as shown in Fig. 10 for right hand component impulses and in Fig. 12 for left hand component impulses.

The law of operation for the multiplying grid wiring with the alternate embodiment is as follows. The outgoing line value from the MP readout is determined in the same manner as with the former embodiment, viz. the wanted impulses for a particular partial product component is deducted from the original brush setting value to obtain the line value. The original brush setting is increased by 10 if required. On the multiplicand entry device, due to the reverse direction of rotation, the law is modified as follows. The wanted impulse is added to the original brush setting value to obtain the line value. If this line value comes out as an amount of 10 or more, 10 is deducted. To illustrate the application of the foregoing law the multiplying grid wiring will be traced for a particular computation. With MP equal 8 and MC equal 3, the wanted right hand component impulse will be 4. Applying the foregoing rule, 8 minus 4 equals 4, the line value of the outgoing line from MP. For the incoming line value into MC for the RH component, we have the following: 3+4=7, 7 being the incoming line value into MC. Accordingly, a wiring connection must be made in the multiplying grid between outgoing line 4 from the MPRO to incoming line 7 entering the RH section of the MCRO readout. Such grid connection is shown at 317 (Fig. 9). For the LH component applying the rule, we have a wanted impulse of 2 which deducted from 8, the original brush setting gives 6 as the outgoing line value from MPRO. Adding 2 to the MC brush setting of 3 gives 5, the incoming line value into MCRO. Accordingly, a connection is made from the 6 outgoing line to the 5 incoming line as indicated at 318 (Fig. 9).

The translators generally designated TRM and TLM (M signifying "modification") function for the same purpose as in the previously described embodiment.

The term "progression coordinator" as hereinafter used, comprises the multiplying grid 300 and the translator units TR and TL shown in Fig. 1B of the drawings.

Cam contacts CC—2, CC—3, FC—2, FC—4, FC—6, FC—7, FC—8 and FC—11 are timed in correspondence with cam contacts bearing like reference numerals in United States Patent to Daly, No. 2,045,437. Cam contacts CC—6 of the instant machine are timed to correspond with the cam contacts CC—4 of the machine shown in the Daly patent and cam contacts CC—7 are timed to correspond with cam contacts CC—2 of the machine of the Daly patent. Cam contacts FC—9 of the instant machine are timed to correspond with cam contacts FC—7 of the Daly machine. Cam contacts CC—8 of the instant machine have a timing duration which is as long as cam contacts CC—2 of the Daly machine. However, instead of closing at 14½ and opening at 15 as does CC—2 in the Daly machine, CC—8 of the instant machine closes at "0" and opens one-half after "0." Contacts 112 and 120 of the instant machine correspond to like numbered contacts of the Daly machine and the reset contacts 195 and 194 of the instant machine correspond to 274 and 273 of the Daly machine. Contacts 189, 190 and 191 of the instant machine correspond to contacts 270, 271 and 272, respectively, of the Daly machine.

The embodiments of the invention herein shown and described comprise impulse transmission selecting means comprising the MPRO readout and the MCRO readout. The brushes of the MPRO readout come into action and rotation successively order by order and rotate concurrently with the rotation of the brushes of the MCRO readout, all of the brushes of which readouts themselves rotate concurrently. Disposed between the readouts are means establishing circuit connections between the readouts, which means include both the multiplying grid wiring and the translator selectors, which latter selectors suppress certain impulse flow, and the wiring to MPRO and MCRO.

It will be understood that impulses are selectively transmitted upon coincidence of timed contacts of the brushes in both readouts whose segments are at that time electrically connected and it will be further understood that impulse selection and transmission is controlled conjointly by both readouts upon their brushes establishing contact with such segments which are then in electrical connection. Each readout may be considered as a timed means for selecting impulse transmission and the cooperation of both timed means is required for final selection and allowance of impulse transmission.

What I claim is:

1. Differential impulse emitting and selecting means for a multiplying machine which comprises multiplier and multiplicand entry receiving means, each with a brush and segment type of readout means, a source of current impulses, means for differentially setting the brushes of each readout upon the entry of factor amounts, means for setting all of the brushes of one entry receiving device and a brush pertaining to a single column of the other entry receiving device into rotation during calculating cycles to make a complete revolution from set position back to set position, and progression coordinating means conditioned in accordance with the value in said single column and including fixed wiring extending from the segments of one readout to the other readout and cooperating with the rotatable brushes to control impulse transmission, said readout brushes themselves in cooperation with the readout segments allowing differential impulse emission.

2. Differentially timed impulse emitting and selecting means for a differentially timed impulse type of machine, comprising entry receiving devices for different entries, each entry receiving device having a settable brush and segment type of readout device, means to enter amounts in said receiving devices, a source of current impulses, means including wiring and circuit establishing means connecting the segments of one entry receiving device to the segments of the other device, means for conditioning said circuit establishing means in accordance with an entry in one of said entry receiving devices, and means for causing the brushes pertaining to different entry receiving devices to be moved concurrently through one complete revolution during calculating with a fixed differential relationship after initial setting so that when contacting with electrically connected segments impulses are allowed to be emitted and selected.

3. The invention according to claim 2 wherein the means including wiring connecting the segments also comprises a multiplying grid so that the emitted selected impulses represent product impulses.

4. A differentially timed impulse emitting and selecting means for a differentially timed impulse type of machine, comprising differentially settable entry receiving devices for different entries, each entry receiving device having a brush and segment type of readout device with the brush of the readout settable during entry, means to enter amounts in said receiving device, a source of current impulses, means including wiring and circuit establishing means connecting the segments of one entry receiving device to the segments of the other, means for conditioning said circuit establishing means in accordance with an entry in one of said entry receiving devices, and means for causing the brushes pertaining to different entry receiving devices to move concurrently through one complete revolution during calculating with a constantly changing differential relationship during motion after initial setting so that when contacting with electrically connected segments impulses are emitted and selected.

5. Impulse emitting and selecting means for a differentially timed impulse type of machine with a source of current impulses, and with means for setting up the factors of the computation and control means controlled thereby and comprising in combination, first circuits for transmitting impulses and other circuits for transmitting impulses, a primary impulse emitting means set according to the digital value of one factor adapted to attempt to impress digital representing impulses upon said first circuits in a changeable relation thereon depending upon which digital value is set up for said one factor of the computation, means for causing rotation of the said last mentioned means through one complete revolution so that emission may be effected, the aforesaid first and other circuits including fixed wiring to coordinate the impulse flow from the said first circuits to said other circuits in accordance with wanted and unwanted progressions, means conditioned under control of said primary impulse emitting means to suppress the impulse flow of impulses which are coordinated to the unwanted progressions and to permit impulse flow of impulses coordinated to the wanted progressions, which wanted progressions are based upon the digital value of one factor of the computation and a further secondary impulse emission allowing and selecting means set according to the other factor with means for causing rotation thereof through one complete revolution to select impulses for further flow according to the digital values of the other factor of the computation and which finally selected impulses represent partial product components.

6. Differentially timed impulse emitting and selecting means for a differentially timed impulse type of machine, comprising movable dual impulse emitting means, means for setting one before emitting movement according to the digital value of an amount in one factor of a computation and means for setting the other before emitting movement according to the other factor of the computation, a source of current impulses, means for causing concurrent rotation of both of the aforesaid dual emitting means through one complete revolution, intermediate electrical connections including impulse flow selecting means conditioned in accordance with the digital value of one factor and fixed wiring intermediate the dual impulse emitting means with which the emitting means conjointly cooperate for controlling the selection and allowance of impulse flow according to progressions which are based upon the digit values of both factors of the computation.

7. Differentially timed impulse emitting and selecting means for a differentially timed impulse type of machine, comprising a primary movable impulse emitting means set according to a single digit factor of a computation, a secondary movable impulse emitting means which is set according to a multi-digit factor of the computation, a source of current impulses, means for causing concurrent rotation of both of the aforesaid movable means through one complete revolution, a setup progression coordinator connected between the two impulse emitting means, means for conditioning said progression coordinator in accordance with the factor setting of the primary movable impulse emitting means, said primary and secondary impulse emitting means cooperating with the progression coordinator to permit impulse flow upon the coincidence of the progressions which are respectively related to a digit value in one factor and all of the digit values which pertain to the other factor.

8. Differentially timed impulse emitting and selecting means for a differentially timed impulse type of machine having factor entering means for both factors, a source of current impulses, a movable impulse transmitting and selecting means which is set before movement by one of the factor entering means according to the digit value of an amount in one factor, another movable impulse transmitting and selecting means which is set before movement by the other factor entering means according to all of the digit values of the amount of the other factor, means for causing rotation of both of said movable impulse transmitting and selecting means through one complete revolution, a progression coordinator conditioned according to the digit value of said one factor and connected to and cooperating with said first mentioned movable impulse emitting means so that said emitting means attempts to establish impulses according to progressions based upon the digit value for which said first mentioned movable impulse emitting means is set, said second mentioned movable impulse transmitting and selecting means connected and cooperating with the progression coordinator to attempt to establish impulse flow according to separate progressions based upon the respective digits of the other factor, said coordinator cooperating with said movable impulse transmitting and selecting means upon coincidence of the progressions based upon the same digits to permit and allow impulse flow at differential times related to the numerical values of the coinciding progressions.

9. An accounting machine having a readout device with movable brushes cooperating with readout segments, said segments being connected to circuits of the accounting machine which selectively make certain segments live by affording current supply thereto, entry controlled means for causing rotational displacement of the brushes in one direction for initially setting the brushes in accordance with an entry, and means for causing rotational displacement of the same brushes in an opposite direction for selectively controlling impulse transmission upon cooperation of said brushes with live segments.

10. An impulse transmitting and selecting means for a differentially timed impulse type of machine adapted to transmit differentially timed impulses to result lines, said means comprising dual impulse selecting means each having movable and stationary parts, means for setting the movable parts of the dual impulse selecting means in accordance with two factor amounts, means for causing concurrent rotation of the movable parts of both selecting means through one complete revolution for causing emission of differentially timed impulses, electrical connections including circuit establishing means conditioned in accordance with the digital value of one factor between the stationary parts of both selecting means including fixed multiplying grid wiring, said fixed multiplying grid wiring cooperating with the emitting and selecting means to coordinate and control the flow of impulses upon the result lines according to a progression.

11. A differentially timed impulse type of accounting machine having result receiving means and means affording electrical connections thereto for impulse flow thereto, a source of current impulses, entry set multiple order impulse transmitting and selecting means, one transmitting and selecting means being provided for each denominational order which is initially differentially set according to the entry in such order, and each means comprising a timed brush means to selectively time impulse transmission of the differentially timed impulses, a cycle controller and means controlled by the cycle controller for successively bringing the different impulse transmitting and selecting means into rotating action order by order, each through a complete revolution, as the calculation proceeds and means controlled by the cycle controller for successively connecting the various timed brush means to the source of current impulses when each timed brush means rotates.

12. Differentially timed impulse transmitting and selecting means for a differentially timed impulse type of machine, comprising a source of current impulses, a single digital order impulse transmitter, means affording electrical connections including a preset progression coordinator connected to the single digital order impulse transmitter, means for setting said single digital order impulse transmitter according to one factor amount, means for conditioning said progression coordinator according to said factor amount, means to cause rotation of said single impulse transmitter through one complete revolution whereby in cooperation with the aforesaid progression coordinator it attempts to form progressions based upon one factor amount which is related to the setting of one impulse transmitter, a multi-denominational order impulse transmitter electrically connected with the progression coordinator, means for setting such multi-denominational order impulse transmitter according to the digital values of the other factor of the computation, means for causing rotation of said multi-denominational order impulse transmitter through one complete revolution so that it also attempts to form progressions based upon the settings of said transmitter, both of said transmitters and coordinator cooperating upon coincidence of the progressions upon the same digits in the progressions to permit and allow impulse flow to occur at differential times related to the numerical value of the coinciding terms of the progressions.

13. Differentially timed impulse transmission controlling and selecting means comprising two entry controlled readout devices each having segment spots and brushes, means to enter amounts and set up the brushes of both devices, a source of current impulses, means establishing circuit connections between the segment spots of the two devices, means for setting elements of said establishing means in accordance with the set up of the brushes of one of the readout devices, means for causing concurrent rotation of the brushes of both devices through one complete revolution so that impulse transmission and selection is allowed at segment spot positions of both readouts other than the entry segment spot position thereof and upon completion of a series circuit by both brushes.

14. A differentially timed impulse type of machine having two readout devices, each including movable brushes and cooperating segments with the brushes set according to entries, said machine including a source of current impulses and including in combination means establishing connecting circuits intermediate the segments of the two readouts, means for setting elements of said establishing means in accordance with the set up of the brushes of one of the readout devices, and means for causing concurrent rotation of the brushes of the two readouts through one complete revolution to allow selective impulse transmission at differential times upon completion of a series circuit through both brushes and segments and means establishing the connecting circuits.

15. An accounting machine comprising a result receiving means, factor receiving means for both factors each having a readout means having brushes set thereby according to entries therein, each readout also comprising segments traversed by the brushes, a source of current impulses, means for establishing electrical circuit connections between the segments of one readout and the segments of the other readout, means to cause the entry receiving means of one readout to rotate all of the brushes thereof through one complete revolution and to cause the entry receiving means of the other readout to rotate a brush thereof through one complete revolution and to selectively cause transmission of impulses to the result receiving means upon said brushes contacting electrically connected segments, and means for setting elements of said circuit establishing means in accordance with the setting of said last mentioned brush prior to the rotation thereof.

16. A differentially timed impulse type of accounting machine having result receiving means and means affording electrical connections thereto for impulse flow thereto, said machine having a source of current impulses, a multi-denominational order readout device with brushes and segments pertaining to each order, means for differentially setting the brushes according to an amount entry and including in combination, means for utilizing the aforesaid readout device as an impulse transmitter for controlling transmission of differentially timed impulses, said means including a cycle controller, means controlled thereby for successively causing rotation of the brushes pertaining to different denominational orders each through a complete revolution and means controlled by the cycle controller for successively connecting the brushes of each order to the source of current impulses whereby differentially timed impulses are transmitted as each of the brushes rotates from its entry position and thereafter completes a circuit.

17. A differentially timed impulse type of accounting machine having result receiving devices controlled by differentially timed impulses, means affording electrical connections thereto for impulse flow thereto, said machine having a readout device with movable brush elements set according to an entry and cooperating with segments, said brush elements and segments pertaining to different denominational orders, said machine including a source of current impulses, and including in combination means for utilizing the readout device itself as an impulse transmitter for controlling the selective transmission of differentially timed impulses, said means including means for causing brush movement of brushes pertaining to different orders in succession each through one complete revolution, and means for connecting the brush elements pertaining to each order to the source of current in succession order by order whereby impulse transmission may be effected successively and for each order by the respective brushes and segments.

ARTHUR H. DICKINSON.